US012664339B2

(12) United States Patent
Wang et al.

(10) Patent No.: US 12,664,339 B2
(45) Date of Patent: Jun. 23, 2026

(54) FRICTION PAIR DEVICES

(71) Applicant: JIANGSU OCEAN UNIVERSITY, Lianyungang (CN)

(72) Inventors: Ze Wang, Lianyungang (CN); Qiong Hu, Lianyungang (CN); Yajing Chen, Lianyungang (CN); Jinhua Wang, Lianyungang (CN); Yang Chen, Lianyungang (CN); Yiming He, Lianyungang (CN); Yan Wang, Lianyungang (CN); Xu Ding, Lianyungang (CN)

(73) Assignee: JIANGSU OCEAN UNIVERSITY, Lianyungang (CN)

( * ) Notice: Subject to any disclaimer, the term of this patent is extended or adjusted under 35 U.S.C. 154(b) by 30 days.

(21) Appl. No.: 19/031,106

(22) Filed: Jan. 17, 2025

(65) Prior Publication Data

US 2025/0165682 A1 May 22, 2025

Related U.S. Application Data

(63) Continuation-in-part of application No. PCT/CN2024/096928, filed on Jun. 3, 2024.

(30) Foreign Application Priority Data

Jun. 9, 2023 (CN) .......................... 202310678988.6

(51) Int. Cl.
*F16K 15/00* (2006.01)
*G06F 30/17* (2020.01)
(Continued)

(52) U.S. Cl.
CPC .............. *G06F 30/27* (2020.01); *G06F 30/17* (2020.01); *G06F 2113/08* (2020.01)

(58) Field of Classification Search
CPC ............. F16K 15/00; F16K 2099/0084; F04B 53/1077
See application file for complete search history.

(56) References Cited

U.S. PATENT DOCUMENTS 1,329,559 A * 2/1920 Tesla ......................... F15D 1/02
137/842
5,265,636 A * 11/1993 Reed ....................... F15C 1/146
137/833

(Continued)

FOREIGN PATENT DOCUMENTS

CN 106090001 A 11/2016
CN 108221155 A 6/2018
(Continued)

OTHER PUBLICATIONS

International Search Report in PCT/CN2024/096928 mailed on Aug. 21, 2024, 6 pages.
(Continued)

*Primary Examiner* — Michael A Riegelman
(74) *Attorney, Agent, or Firm* — PORUS IP LLC

(57) ABSTRACT

Provide is a friction pair device comprising a friction pair stationary member, a plurality of micro channels, a Tesla valve structure, and a stress application device. The friction pair stationary member includes a friction pair static surface, which friction pair static surface is provided with a dynamic pressure groove. The dynamic pressure groove includes a dynamic pressure groove bottom. A surface of the dynamic pressure groove bottom is provided with micro-nano scale gaps. A super-lubricant is injected into the gaps to form a super-lubricant layer, allowing liquid medium molecules of a liquid-film to move freely along the dynamic pressure groove bottom. A slip velocity of the liquid medium molecules approaches a moving velocity of a friction pair dynamic surface, a slip length of the liquid medium mol-
(Continued)

ecules approaches positive infinity, and a super slip surface is formed on the dynamic pressure groove bottom.

20 Claims, 15 Drawing Sheets

(51) Int. Cl.
　　*G06F 30/27*　　　　(2020.01)
　　*G06F 113/08*　　　(2020.01)

(56)　　　　References Cited

U.S. PATENT DOCUMENTS

| | | | | |
|---|---|---|---|---|
| 5,876,187 | A * | 3/1999 | Forster | F16K 99/0021 |
| | | | | 417/322 |
| 11,047,249 | B2 * | 6/2021 | Schwendenmann | F16J 15/44 |
| 11,719,236 | B2 * | 8/2023 | Siebert | F16K 51/00 |
| | | | | 138/37 |
| 11,745,324 | B2 * | 9/2023 | Swinford | B25D 9/125 |
| | | | | 173/200 |
| 12,110,764 | B2 * | 10/2024 | Ringgenberg | E21B 34/14 |
| 12,310,304 | B2 * | 5/2025 | Rollwa | A01G 9/02 |
| 12,345,227 | B1 * | 7/2025 | Collins, Jr. | E02B 1/003 |
| 12,374,752 | B2 * | 7/2025 | Lee | H01M 50/367 |
| 12,404,951 | B1 * | 9/2025 | Spremo | F16K 99/0015 |
| 12,477,707 | B2 * | 11/2025 | Wang | H05K 7/20309 |
| 12,562,443 | B2 * | 2/2026 | Alig | F16K 15/00 |
| 2011/0192521 | A1 * | 8/2011 | Ducros | C23C 14/28 |
| | | | | 156/60 |
| 2015/0330565 | A1 | 11/2015 | Meng et al. | |
| 2017/0015835 | A1 | 1/2017 | Aizenberg et al. | |
| 2022/0349654 | A1 * | 11/2022 | Li | F28B 1/02 |
| 2024/0098937 | A1 * | 3/2024 | Provenziani | F28F 3/12 |
| 2024/0109771 | A1 * | 4/2024 | Takahata | B81B 3/0021 |
| 2025/0165682 | A1 * | 5/2025 | Wang | G06F 30/17 |
| 2025/0367781 | A1 * | 12/2025 | Lei | B24B 31/006 |
| 2026/0002847 | A1 * | 1/2026 | Ramakrishnan | G01N 1/2035 |

FOREIGN PATENT DOCUMENTS

| | | | | |
|---|---|---|---|---|
| CN | 108757945 | A | 11/2018 | |
| CN | 109598031 | A | 4/2019 | |
| CN | 114922978 | A * | 8/2022 | F16J 15/3496 |
| CN | 116738611 | A | 9/2023 | |
| GB | 2601685 | A | 6/2022 | |
| WO | 2016066906 | A1 | 5/2016 | |
| WO | 2024024839 | A1 | 2/2024 | |

OTHER PUBLICATIONS

Written Opinion in PCT/CN2024/096928 mailed on Aug. 21, 2024, 6 pages.

* cited by examiner

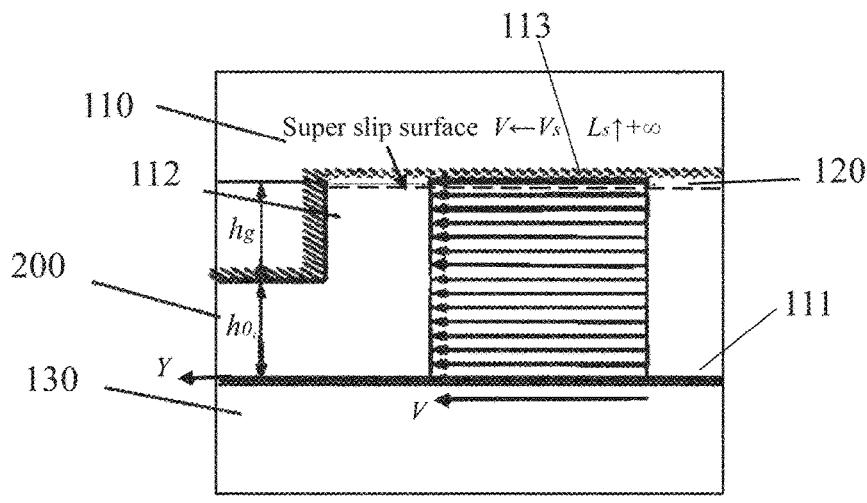
FIG. 1a
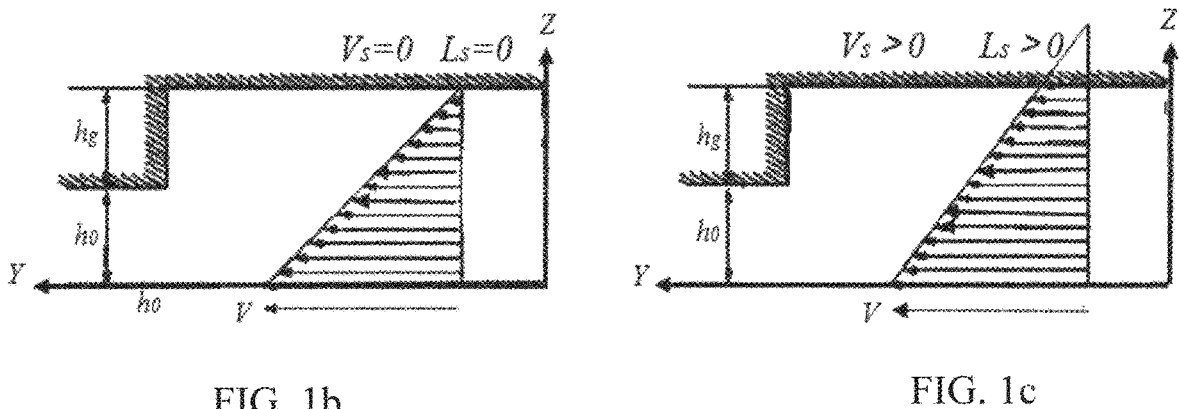
FIG. 1b                 FIG. 1c
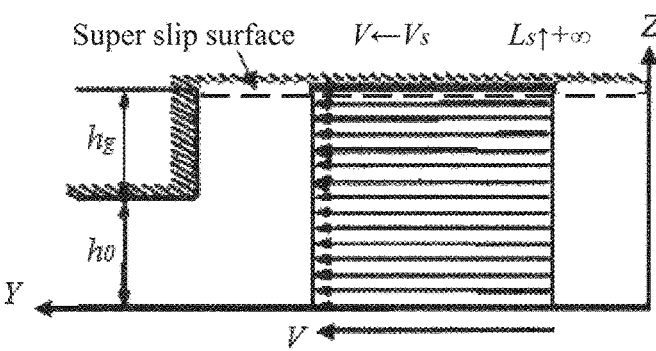
FIG.1d

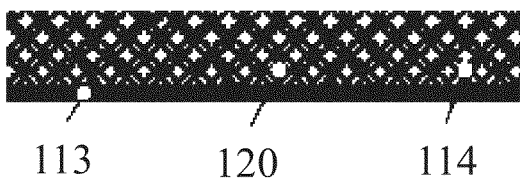
113    120    114
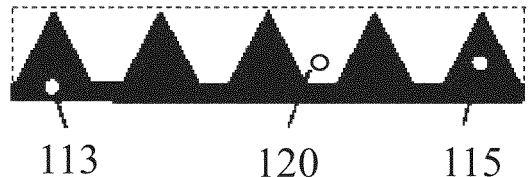
113    120    115
FIG. 2

FRICTION PAIR DEVICES

CROSS REFERENCE TO RELATED APPLICATIONS

This application is a Continuation-in-part of International Patent Application No. PCT/CN2024/096928, filed on Jun. 3, 2024, which claims priority to Chinese Patent Application No. 202310678988.6, filed on Jun. 9, 2023, the entire contents of each of which are incorporated herein by reference.

TECHNICAL FIELD

The present disclosure relates to the field of friction pair design, and in particular, relates to a friction pair device.

BACKGROUND

Improving the load-bearing capacity of friction pairs and reducing shear friction loss has long been a focus in the field of tribology. Boundary slip may occur between fluid molecules and a solid surface due to the poor wettability of the solid surface. Typically, both a hydrophobic surface and a hydrophilic surface exhibit boundary slip, with a slip length generally in the micro- to nanometer scale. For friction pairs, any change in boundary slip may alter their load-bearing capacity, frictional characteristics, and flow field properties. Studies have shown that inducing and increasing boundary slip is an important approach to enhancing fluid flow velocity and improving the efficiency of micro- and nanoscale fluid systems.

Numerous researchers have designed slip surfaces for friction pairs to enhance load-bearing capacity or reduce frictional loss. Results indicate that a combination of slip and textured designs can achieve superior tribological performance. For example, a smooth friction pair surface may produce a slip length of 10 nm to 2 μm, while a friction pair surface with a micro- and nanotexture have achieved the largest slip length reported so far, at 400 μm. However, both the smooth friction pair surface and the friction pair surface with the micro- and nanotexture face significant challenges in achieving macroscopic slip.

To address this, an approach was developed to inject a low-surface-energy super-lubricant into micro-nano scale gaps of a roughened solid surface, replacing air layers and producing a highly effective slippery surface, referred to as a Slippery Liquid-Infused Porous Surface (SLIPS). This approach is currently the mainstream approach for fabricating the SLIPS. However, practical applications have revealed a major issue: the depletion of the sper-lubricant layer leads to the failure of the SLIPS.

In view of this, the present disclosure aims to provide a friction pair device that not only exhibits superior tribological performance but also allows for real-time replenishment of depleted super-lubricant, thereby extending the service life of the SLIPS. Additionally, the super-lubricant is designed to possess a certain load-bearing capacity, further enhancing the durability of the friction pair.

SUMMARY

One or more embodiments of the present disclosure provide a friction pair device. The friction pair device comprises a friction pair stationary member, a plurality of micro channels, a Tesla valve structure, and a stress application device.

The friction pair stationary member includes a friction pair static surface, which is provided with a dynamic pressure groove. The dynamic pressure groove includes a dynamic pressure groove bottom, and a surface of the dynamic pressure groove bottom has micro-nano scale gaps. A super-lubricant is disposed within the micro-nano scale gaps. The super-lubricant is injected into the micro-nano scale gaps to form a super-lubricant layer. The super-lubricant layer allows a liquid-film and liquid medium molecules of a super-lubricant layer interface to move freely along the dynamic pressure groove bottom. A slip velocity of the liquid medium molecules approaches a moving velocity of a friction pair dynamic surface, a slip length of the liquid medium molecules approaches positive infinity, and a super slip surface is formed on the dynamic pressure groove bottom of the friction pair static surface.

The plurality of micro channels are disposed in regions in which at least one of a pressure, a temperature, and a velocity of the liquid film is uniform. The plurality of micro channels are in communication with the dynamic pressure groove bottom, and the super-lubricant enters the dynamic pressure groove bottom through the plurality of micro channels.

The Tesla valve structure includes a forward Tesla valve and a reverse Tesla valve. The forward Tesla valve is configured to enable a flow connection between the plurality of micro channels and an oil reservoir, and the reverse Tesla valve is configured to enable a flow connection between the dynamic pressure groove bottom and the oil reservoir.

The stress application device is configured to apply a shear stress to the liquid medium molecules via one or more of a temperature gradient, a magnetic field, or an electric field.

In some embodiments, the gaps on the surface of the dynamic pressure groove bottom are obtained by roughening an original dynamic pressure groove bottom. The roughening includes plating a porous coating or preparing a micro-nano structure on the original dynamic pressure groove bottom of the friction pair static surface.

In some embodiments, the super-lubricant includes a low-surface-energy super-lubricant, the low-surface-energy super-lubricant being a solution formed by mixing lauric acid and silicone oil.

In some embodiments, when an amount of the super-lubricant at the dynamic pressure groove bottom is less than a first predetermined threshold, the super-lubricant flows sequentially from the oil reservoir into the forward Tesla valve, the micro channels, and the dynamic pressure groove bottom, to replenish the super-lubricant in the super-lubricant layer on the dynamic pressure groove bottom. When the amount of the super-lubricant at the dynamic pressure groove bottom is greater than a second predetermined threshold, the super-lubricant flows sequentially from the dynamic pressure groove bottom into the micro channels, the reverse Tesla valve, and the oil reservoir, and a portion of the super-lubricant is recovered.

In some embodiments, the friction pair device further includes a processing device and a storage device. Each of the processing device and the storage device is communicatively connected to one or more of a temperature sensor, a first pressure sensor, a second pressure sensor, an electric piston, a vibration sensor, a first solenoid valve, and a second solenoid valve.

In some embodiments, the processing device is configured to: determine, through a movement parameter model, a movement parameter of the electric piston based on a replenishment pressure and a recovery pressure; and control the electric piston to operate based on the movement parameter. The movement parameter model is a machine learning model stored in the storage device.

One or more embodiments of the present disclosure provide a liquid film sealing device that includes the friction pair device as previously described.

BRIEF DESCRIPTION OF THE DRAWINGS

The present disclosure will be further illustrated by way of exemplary embodiments, which will be described in detail through the accompanying drawings. These embodiments are non-limiting exemplary embodiments, in which same reference numerals represent same structures, wherein:

FIG. 1a is a schematic diagram illustrating the principle of a friction pair device according to some embodiments of the present disclosure; FIG. 1b is an exemplary schematic diagram of the friction pair device in a no-slip state according to some embodiments of the present disclosure; FIG. 1c is a schematic diagram of the friction pair device in a general-slip state according to some embodiments of the present disclosure; FIG. 1d is a schematic diagram of the friction pair device in a super-slip state according to some embodiments of the present disclosure;

FIG. 2 is a schematic diagram of an exemplary structure of a dynamic pressure groove bottom according to some embodiments of the present disclosure;

DETAILED DESCRIPTION

Figure 3:
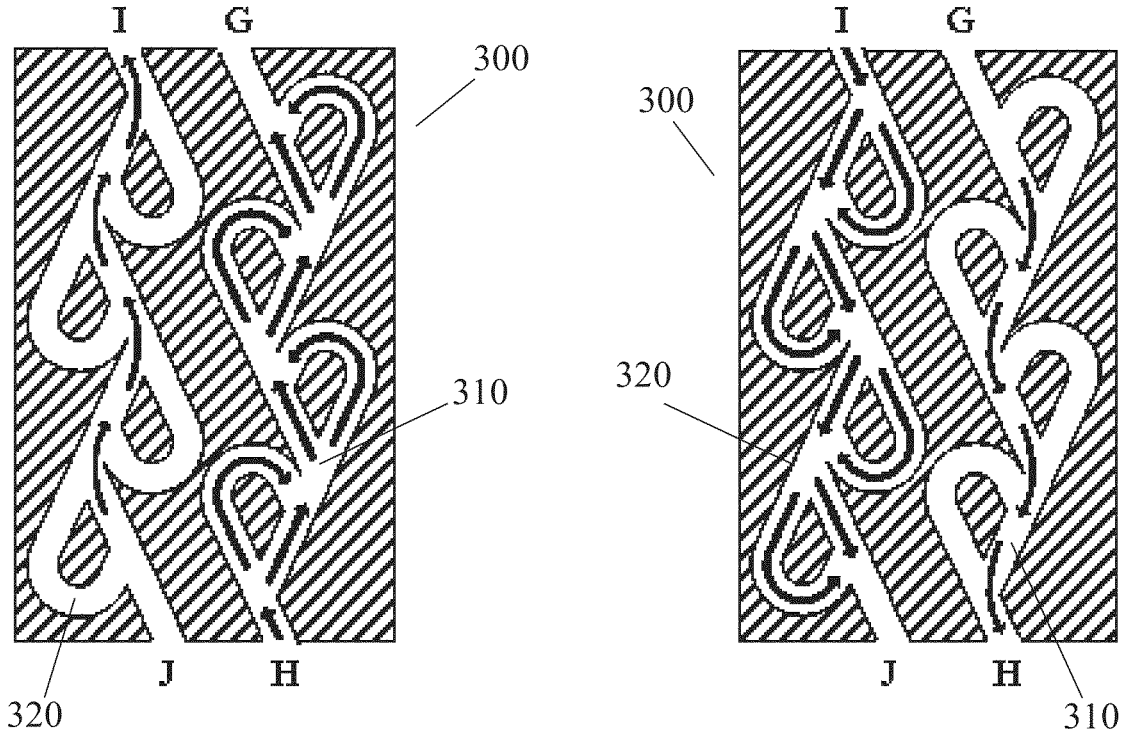
FIGS. 3a and 3b are schematic diagrams of an exemplary Tesla valve structure according to some embodiments of the present disclosure.

In order to more clearly illustrate the technical solution of the embodiments of the present disclosure, the drawings required to be used in the description of the embodiments are briefly described below. Obviously, the drawings in the following description are only some examples or embodiments of the present disclosure, and it is possible for those skilled in the art to apply the present disclosure to other similar scenarios according to these drawings without creative labor. Unless obviously obtained from the context or the context illustrates otherwise, same reference numerals in the drawings represent same structures or operations.

It should be understood that the terms "system," "device," "unit," and/or "module" as used herein is a way to distinguish between different components, elements, parts, sections or assemblies at different levels. However, these words may be replaced by other expressions if other words accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Some embodiments of the present disclosure provide a friction pair device, in which a super-lubricant layer formed by a super-lubricant of the friction pair is maintained in a super-slip state, thereby enhancing fluid dynamic pressure while reducing frictional energy consumption.

FIG. 1a is a schematic diagram illustrating the principle of a friction pair device according to some embodiments of the present disclosure.

In some embodiments, the friction pair device includes a friction pair stationary member 110. In some embodiments, the friction pair device further includes a friction pair moving member 130. In some embodiments, a super-lubricant 120 is provided between the friction pair stationary member 110 and the friction pair moving member 130. In some embodiments, a liquid medium 200 is provided between the super-lubricant 120 and the friction pair stationary member 110 or the friction pair moving member 130.

A friction pair is a system consisting of two objects that are in direct contact and produce relative frictional motion. The friction pair device is a device that contains the friction pair. The friction pair is widely used in mechanical structures. For example, the friction pair may be applied to bearings or seals. Taking a sliding bearing as an example, the friction pair is a structure that utilizes a lubricating oil film to form a thin layer of oil between a shaft and a bearing shell of the sliding bearing, separating contact surfaces to reduce friction and wear.

The friction pair stationary member is a part that does not move in the friction pair. The friction pair moving member is a part that moves in the friction pair. For example, in the case of a slider and a slide rail in a sliding friction pair, the friction pair stationary member is the slider that does not undergo movement, and the friction pair moving member is the slide rail that undergoes movement. As another example, in the case of a rotating member and a stationary member in a plain bearing, the friction pair stationary member is the stationary member that does not move, and the friction pair moving member is the rotating member that rotates.

In some embodiments, the friction pair moving member may include a friction pair dynamic surface. The friction pair stationary member may include a friction pair static surface. The friction pair dynamic surface is an interface at which motion occurs during motion of the friction pair. The friction pair static surface is an interface at which no motion occurs during motion of the friction pair. For example, in the case of the sliding friction pair, the friction pair dynamic surface is the surface on the slider that is in contact with the slide rail, the friction pair static surface is the surface on the slide rail that is in contact with the slider.

The super-lubricant 120 is a fluid capable of forming a super slip surface on a dynamic pressure groove bottom of the friction pair static surface. For example, the super-lubricant 120 may be a perfluorinated fluid.

The liquid medium 200 between the friction pair may be used to reduce frictional resistance of the friction pair. For example, the liquid medium 200 may be water, mineral oil, a water-based lubricant, or the like. In some embodiments, the liquid medium 200 forms a liquid film between the friction pair stationary member and the friction pair moving member, thereby reducing friction and wear.

In some embodiments, a composition of the super-lubricant 120 is different from a composition of the liquid medium 200. For example, when the friction pair device is used in a sealing device, the liquid medium 200 is the fluid that is being sealed, e.g., when the friction pair device is a water pump, the liquid medium 200 is water, when the friction pair device is an oil pump, the liquid medium 200 is oil. As another example, when the friction pair device is used in a bearing, the liquid medium 200 may be a lubricant corresponding to the bearing; e.g., the liquid medium 200 is a mineral oil lubricant, a bio-based oil lubricant, or the like. In the foregoing cases, the super-lubricant 120 may be a perfluorinated fluid.

In some embodiments, the super-lubricant 120 is disposed between the friction pair stationary member 110 and the friction pair moving member 130, as shown in FIG. 1a.

In some embodiments, the super-lubricant may include a low-surface-energy super-lubricant. The low-surface-energy super-lubricant may be a solution of a mixture of lauric acid and silicone oil. The lauric acid and the silicone oil may be mixed in a certain ratio. For example, a weight ratio of the lauric acid and the silicone oil may be 1:9, 2:17, or the like.

In some embodiments, a boundary slip may include a no-slip state, a general-slip state, and a super-slip state.

The boundary slip (also referred to as an interface slip or a wall slip) refers to the existence of a relative tangential velocity of motion between fluid molecules on a solid surface and the solid surface. Studies have shown that the boundary slip is not likely to occur at a macroscopic scale, and even if the boundary slip occurs, its effect is negligible. However, at a micro- and nanoscale, such as in a micro-electromechanical system/nano-electromechanical system (MEMS/NEMS), a microfluidic system, or a system involving friction that requires friction reduction, the boundary slip may have an important impact on system performance.

The no-slip state refers to a state in which, when a relative motion occurs between the friction pair stationary member and the friction pair moving member, a slip velocity of liquid medium molecules in the liquid film is equal to or close to zero, and a slip length is equal to or close to zero.

The general-slip state refers to a state in which, when a relative motion occurs between the friction pair stationary member and the friction pair moving member, the slip velocity of the liquid medium molecules in the liquid film is greater than zero but smaller than or much smaller than a moving velocity of the friction pair dynamic surface, or the slip length is greater than zero but much smaller than a slip length when an interfacial shear stress is zero.

The super-slip state refers to a state in which, when a relative motion occurs between the friction pair stationary member and the friction pair moving member, the slip velocity of the liquid medium molecules in the liquid film approaches the moving velocity of the friction pair dynamic surface, the interfacial shear stress approaches zero, and the slip length approaches positive infinity.

The slip length refers to a distance from a solid-liquid interface to a point where a tangential velocity of the fluid is extrapolated to zero. The slip length may have a significant effect on the motion of the fluid. For example, in tribology, the study of the slip length helps to understand the formation and properties of lubricating films. As another example, in interface science, the analysis of the slip length helps to explore phenomena such as wettability and surface tension. In some embodiments, the magnitude of the slip length is influenced by a variety of factors, such as hydrophilicity and hydrophobicity of the solid interface, a degree of roughness of the solid interface, or the like.

In some embodiments, the friction pair device includes the friction pair stationary member, a plurality of micro channels, a Tesla valve structure, and a stress application device.

FIG. 1b is a schematic diagram of a friction pair device in the no-slip state according to some embodiments of the present disclosure; FIG. 1c is a schematic diagram of the friction pair device in the general-slip state according to some embodiments of the present disclosure; FIG. 1d is a schematic diagram of the friction pair device in the super-slip state according to some embodiments of the present disclosure. In the above drawings, V denotes the moving velocity of the friction pair dynamic surface, $h_0$ denotes a thickness of a liquid film formed by the liquid medium in a non-groove region, $h_g$ denotes a depth of the dynamic pressure groove, $L_s$ denotes the slip length of the liquid medium molecules, and $v_s$ denotes the slip velocity of the liquid medium molecules.

In some embodiments, as shown in FIG. 1a, a friction pair stationary member 110 includes a friction pair static surface 111, the friction pair static surface 111 is provided with a dynamic pressure groove 112. The dynamic pressure groove 112 includes a dynamic pressure groove bottom 113, the dynamic pressure groove bottom 113 has micro-nano scale gaps on a surface of the dynamic pressure groove bottom 113, and a super-lubricant 120 is disposed in the micro-nano scale gaps. The super-lubricant 120 is injected into the micro-nano scale gaps to form a super-lubricant layer (e.g., a fluid layer between the dotted line in FIG. 1a and the dynamic pressure groove bottom 113), the super-lubricant layer allows a liquid-film and liquid medium molecules of a super-lubricant layer interface to move freely along the dynamic pressure groove bottom 113, a slip velocity of the liquid medium molecules approaches a moving velocity of a friction pair dynamic surface, a slip length of the liquid medium molecules approaches positive infinity, and a super slip surface is formed on the dynamic pressure groove bottom 113 of the friction pair static surface. The super-lubricant layer interface refers to an interface where the super-lubricant layer is in contact with the liquid film.

The friction pair static surface 111 is a surface of the friction pair stationary member 110 that contacts or rubs against the friction pair moving member 130. Merely by way of example, the friction pair static surface 111 may include a super-lubricant layer formed by the super-lubricant 120 at the dynamic pressure groove 112.

The dynamic pressure groove 112 refers to a groove on the friction pair static surface 111. In some embodiments, the dynamic pressure groove may be an open groove or a closed groove. The open groove is a groove with an open mouth, and the closed groove is a groove with a partially closed mouth. Merely by way of example, the open groove is a groove that is visible when observing from an outer side of the friction pair, and the closed groove is a groove that is not visible when observing from the outer side of the friction pair.

In some embodiments, a size, a location, and a count of the dynamic pressure groove are determined based on a variety of factors, such as an application scenario of the friction pair device (e.g., for seals or bearings), a difference between an inner diameter and an outer diameter of the friction pair stationary member, a difference between an internal pressure and an external pressure of the liquid film, a temperature of the dynamic pressure groove, a structural parameter of a groove shape of the dynamic pressure groove, or the like. In some embodiments, a technician may perform a simulation based on a variety of factors through a simulation software or simulation program to determine the size, the location, and the count of the dynamic pressure groove based on a simulation result.

In some embodiments, the groove shape of the dynamic pressure groove may be any shape. For example, the dynamic pressure groove is one or more of a spiral groove, an arcuate groove, a fan-shaped groove, a rhombic groove, a T-shaped groove, an L-shaped groove, or the like. More detailed descriptions of the dynamic pressure groove 112 may be found in FIG. 2, FIG. 6, FIG. 7, and the related descriptions thereof.

The dynamic pressure groove bottom 113 refers to a bottom portion of the dynamic pressure groove 112. For example, as shown in FIG. 1a, the depth of the dynamic pressure groove 112 is $h_g$, the bottom portion of the dynamic pressure groove 112 is the dynamic pressure groove bottom 113, and the dynamic pressure groove 112 includes the liquid medium 200. The thickness of the liquid film formed by the liquid medium 200 in the non-groove region is $h_0$.

The micro-nano scale refers to a size of an object or a material at the micrometer (μm) or nanometer (nm) level. In some embodiments, the surface of the dynamic pressure groove bottom 113 has micro-nano scale gaps, which increase a specific surface area of the dynamic pressure groove bottom 113, allowing super-lubricant molecules to more easily adsorb onto the dynamic pressure groove bottom 113, forming a low surface energy super slip surface. The low surface energy super slip surface can accelerate a rate at which fluid in the dynamic pressure groove 112 gathers toward the dynamic pressure groove bottom 113, thereby enhancing a fluid dynamic pressure.

The super slip surface refers to a surface that utilizes the micro-nano scale gaps to lock in the super-lubricant 120, thereby forming the super-lubricant layer that cooperates with the liquid film between the friction pair to reduce resistance to motion between the friction pair stationary member and the friction pair moving member.

In some embodiments, as shown in FIG. 1b, if no super-slip modification treatment is performed on the dynamic pressure groove bottom, the friction pair moving member is tightly adhered to the liquid film, forming a flow-solid interface, and the friction pair is in the no-slip state. In other words, the slip velocity $v_s$ of the liquid medium molecules of the dynamic pressure groove bottom approaches zero, the slip length $L_s$ approaches zero, and the friction pair device is in the no-slip state. As shown in FIG. 1c, in some embodiments, when the surface of the dynamic pressure groove bottom is hydrophobic, the slip velocity $v_s$ of the liquid-film and liquid medium molecules of a super-lubricant layer interface is greater than zero, and the slip length $L_s$ is greater than zero, and at this time, the friction pair device is in the general-slip state. As shown in FIG. 1a and FIG. 1d, when the dynamic pressure groove bottom has the micro-nano scale gaps, the slip velocity $v_s$ of the liquid-film at the dynamic pressure groove bottom 113 and the liquid medium molecules (i.e., the super-lubricant) of the super-lubricant layer interface approaches the moving velocity $V$ of the friction pair-moving member, the slip length $L_s$ approaches positive infinity, so that the liquid film formed by the liquid medium 200 may maintain its integrity, and the friction pair moving member is in the super-slip state.

In some embodiments, the micro-nano scale gaps at the dynamic pressure groove bottom is obtained by roughing an original dynamic pressure groove bottom. The roughening treatment refers to increasing a surface roughness of the original dynamic pressure groove bottom. For example, the roughening treatment includes plating a porous coating (e.g., SiO2, etc.) on the original dynamic pressure groove bottom of the friction pair. As another example, the roughing treatment includes other techniques that increases the surface roughness of the original dynamic pressure groove bottom, such as a laser processing technique, a physical deposition technique, a chemical deposition technique, or the like.

In some embodiments, the micro-nano scale gaps at the dynamic pressure groove bottom may include a porous structure or a rough body. The porous structure refers to a network of closed or interpenetrating holes, such as a porous structure formed by plating $SiO_2$ on the original dynamic pressure groove bottom. The rough body refers to a structure having a rough surface, such as a rough surface (e.g., the dynamic pressure groove bottom with a rough surface) obtained by processing the original dynamic pressure groove bottom using the laser processing technique, the physical deposition technique, the chemical deposition technique, or the like.

In some embodiments, a processing device or technician may continuously inject the super-lubricant into the roughened surface of the dynamic pressure groove bottom. The continuously injected super-lubricant may rapidly expand at the dynamic pressure groove bottom and firmly adsorbed into the micro-nano scale gaps in the dynamic pressure groove bottom. In response to the injection of the super-lubricant reaching a predetermined capacity, the super-lubricant layer may be formed on the surface of the dynamic pressure groove bottom. Based on the super-lubricant layer, the dynamic pressure groove bottom of the friction pair may form the super slip surface. The predetermined capacity may be set by a person skilled in the art based on experience.

In some embodiments, the surface of the dynamic pressure groove bottom is designed to allow for super-wetting of the super-lubricant.

Super-wetting refers to an ability of a material to effectively prevent contact or penetration of fluids (e.g., water, the super-lubricant, etc.). For example, the super-wetting includes super-hydrophobicity and super-oleophobicity. In some embodiments, a condition of the super-wetting may include a contact angle between the super-lubricant and the dynamic pressure groove bottom being smaller than a contact angle threshold. The contact angle threshold may be predetermined by a person skill in the art based on experience. In some embodiments, the smaller the contact angle between the super-lubricant and the dynamic pressure groove bottom is, the better a wetting effect is.

FIG. 2 is a schematic diagram of an exemplary structure of a dynamic pressure groove bottom according to some embodiments of the present disclosure.

In some embodiments, as shown in FIG. 2, a super-slip modified dynamic pressure groove bottom 113 may be obtained by roughening an original dynamic pressure groove bottom. The super-slip modified dynamic pressure groove bottom 113 may include a porous structure 114 or a rough body 115.

In some embodiments of the present disclosure, by roughening an original dynamic pressure groove bottom, super-slip modification of the dynamic pressure groove bottom may be achieved. A super-lubricant layer formed by a super-lubricant on the dynamic pressure groove bottom may create a super slip surface as the friction pair dynamic surface moves. The super slip surface not only enhances a dynamic pressure of the lubricating fluid but also reduces frictional energy consumption. For example, in experimental studies on the super-slip modification of sliding friction pairs, a load-bearing capacity of the liquid film may increase by 252.66%, and a viscous friction may be reduced by 19.98%.

The micro channels (e.g., the micro channels 620 shown in FIG. 6) are channels with relatively small dimensions. For example, the size of a single micro channel may be 0.4 mm, 0.6 mm, or the like.

In some embodiments, the plurality of micro channels are disposed in regions in which at least one of a pressure, a temperature, and a velocity of the liquid film is uniform. The plurality of micro channels are in communication with the dynamic pressure groove bottom, and the super-lubricant enters the dynamic pressure groove through the plurality of micro channels. For example, the plurality of micro channels are disposed in regions where the pressure of the liquid film is the same at the dynamic pressure groove bottom. As another example, the plurality of micro channels are provided in regions where the temperature and the velocity of the liquid film at the dynamic pressure groove bottom are the same.

FIGS. 3a and 3b are schematic diagrams of an exemplary Tesla valve structure according to some embodiments of the present disclosure.

A Tesla valve structure 300 refers to a unidirectional fluid valve with no moving parts formed by special structural design. The Tesla valve structure has no moving parts and possesses a unidirectional conductivity characteristic, i.e., Tesla valve structure does not require an external energy input, and ensures that a fluid flows unobstructed in a particular direction; if the fluid attempts to flow in an opposite direction, the fluid is blocked.

Merely by way of example, the Tesla valve structure 300 includes a plurality of alternating branching lines. The Tesla valve structure 300 may include a first line and a second line. The first line is slightly inclined, the second line is bent to form a half-loop, and two ends of the second line are connected to the first line.

In some embodiments, the Tesla valve structure 300 includes a forward Tesla valve 310 and a reverse Tesla valve 320 as shown in FIGS. 3a and 3b. The forward Tesla valve 310 is configured to enable a flow connection between the micro channels and an oil reservoir (the super-lubricant flows from H to G). As shown in FIG. 3b, the reverse Tesla valve 320 is configured to enable a flow connection between the dynamic pressure groove bottom 113 and the oil reservoir (the super-lubricant flows from I to J). A conduct direction of the forward Tesla valve and a conduct direction of the reverse Tesla valve are opposite.

The oil reservoir is a container for storing the super-lubricant. For example, the super-lubricant in the oil reservoir may pass through the forward Tesla valve and the micro channels in sequence to reach the dynamic pressure groove bottom. A channel through which the super-lubricant flows to the dynamic pressure groove bottom is referred to as a replenishment channel. As another example, the super-lubricant at the dynamic pressure groove bottom may pass through the micro channels and the reverse Tesla valve in sequence to reach the oil reservoir. A channel through which the super-lubricant flows to the oil reservoir is referred to as a recovery channel. More detailed descriptions of the oil reservoir may be found in FIG. 6, FIG. 7, FIG. 9, and the related descriptions thereof.

In some embodiments of the present disclosure, the Tesla valve structure ensures unobstructed flow of fluid in a particular direction, which enables self-repair (i.e., the Tesla valve structure may automatically adjust the super-lubricant at the dynamic pressure groove bottom) of the friction pair device without the need for action by other devices, thereby reduce the count of moving parts, and increasing the reliability of the friction pair device.

In some embodiments, the plurality of micro channels are in communication with the dynamic pressure groove bottom, and real-time replenishment and recovery of the super-lubricant can be achieved through the plurality of micro channels.

For example, when a loss volume of the super-lubricant from the super slip surface exceeds a loss threshold, replenishing super-lubricant may move toward the dynamic pressure groove bottom through the micro channels, and quickly spread on the surface of the dynamic pressure groove bottom, thereby realizing rapid replenishment. The loss threshold may be predetermined by a person skilled in the art based on experience.

As another example, if the super slip surface is replenished with an amount of super-lubricant greater than a replenishment threshold due to an external disturbance, the micro channels may quickly recover the excess super-lubricant. The replenishment threshold may be predetermined by a person skilled in the art based on experience.

As a further example, the micro channels may be in a dormant state if the loss volume of the super-lubricant from the super slip surface is less than a loss threshold and the replenishment amount is less than the replenishment threshold.

The dormant state is a state in which a flow volume of the liquid medium in the micro channels is less than a flow volume threshold. The loss threshold, the replenishment threshold, and the flow volume threshold may be predetermined by a person skilled in the art based on experience.

Figure 4:
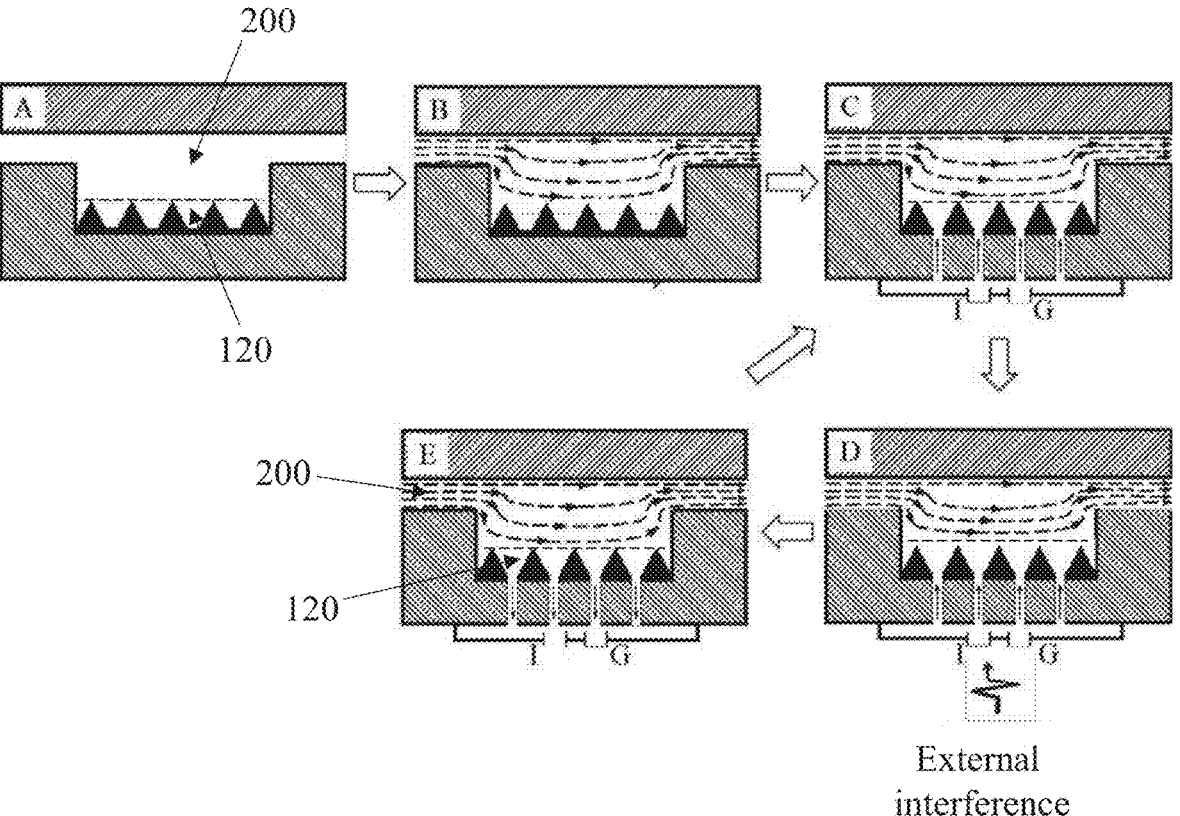
FIG. 4 is a schematic diagram showing an exemplary process for replenishment and recovery of a super-lubricant according to some embodiments of the present disclosure.

Taking the super slip surface of a rough body as an example, the process of the replenishment and recovery of the super-lubricant is shown in FIG. 4.

In some embodiments of the present disclosure, the super-lubricant has good wettability, and may be effectively impregnated in the micro-nano scale gaps to form the super slip surface, thereby reducing the wear and tear of the friction pair dynamic surface, and extends the service life of the friction pair. In addition, the super-lubricant has mobility, so that the super-lubricant may fill the micro-nano scale gaps, enabling self-repair of the super slip surface after being damaged, which further improves the durability of the friction pair.

is a schematic diagram showing an exemplary process for replenishment and recovery of a super-lubricant according to some embodiments of the present disclosure. In FIG. 4, A illustrates a normally functioning super slip surface, B illustrates a super slip surface after loss of the super-lubricant 120, C illustrates replenishment of the super-lubricant, D illustrates oversupply of the super-lubricant under an external interference, and E illustrates recovery of the excess super-lubricant by micro channels.

In some embodiments, as shown in A, B, and C of FIG. 4, the super-lubricant 120 of the normally functioning super slip surface lost under an action of a complex flow field. When the super-lubricant 120 is lost, the integrity of the liquid film formed by the liquid medium 200 may be compromised. In response to the loss of super-lubricant from the super slip surface being greater than the loss threshold, the super-lubricant from the oil reservoir or a second reservoir ring groove (see FIGS. 6 and 7) may enter dynamic pressure groove bottom through the micro channels at position I to enable rapid replenishment of the super-lubricant.

In some embodiments, as shown in A, D, and E of FIG. 4, when the normally functioning super slip surface is subject to an external interference, it may result in an oversupply of the super-lubricant. In response to the replenishment amount of the super-lubricant to the super slip surface being greater than the replenishment threshold, the excess super-lubricant exceeding the capacity of the dynamic pressure groove may be accommodated by the micro channels and pass through the micro channels at position G to the oil reservoir or the second reservoir ring groove, realizing rapid recovery of the super-lubricant. Positions I and G are positions where the Tesla valve structure and the oil reservoir are connected.

In some embodiments, when an amount of the super-lubricant at the dynamic pressure groove bottom is less than a first predetermined threshold, the super-lubricant flows sequentially from the oil reservoir to the forward Tesla valve, the micro channels, and the dynamic pressure groove bottom, to replenish the super-lubricant of the super-lubricant layer of the dynamic pressure groove bottom. At this time, the replenishment channel is a channel formed by the forward Tesla valve, the micro channels, and the dynamic pressure groove bottom. The first predetermined threshold may include an amount of the super-lubricant that the dynamic pressure groove may hold. For example, the first predetermined threshold may include a volume or mass of the super-lubricant corresponding to a volume of the dynamic pressure groove bottom.

In some embodiments, when the amount of the super-lubricant at the dynamic pressure groove bottom is greater than a second predetermined threshold, the super-lubricant flows from dynamic pressure groove bottom into the micro channels, the reverse Tesla valve, and the oil reservoir in sequence, and a portion of the super-lubricant is recovered. At this time, the recovery channel is a channel formed by the micro channels, the reverse Tesla valve, and the oil reservoir. The second predetermined threshold is greater than the first predetermined threshold. The second predetermined threshold may include an amount of super-lubricant that the dynamic pressure groove may hold and an amount of redundancy that it may withstand. For example, the first predetermined threshold may include a volume or mass of super-lubricant corresponding to the volume of the dynamic pressure groove bottom and a volume or mass of the super-lubricant that may be compressed.

In some embodiments, when the amount of the super-lubricant at the dynamic pressure groove bottom is less than the first predetermined threshold, a pressure difference between the oil reservoir and the friction pair stationary member changes. In other words, if a pressure of the super-lubricant in the friction pair stationary member becomes smaller, the oil reservoir is able to push the super-lubricant towards the friction pair stationary member. Conversely, if the pressure of the super-lubricant in the friction pair stationary member becomes larger, the super-lubricant moves toward the oil reservoir. The first predetermined threshold and the second predetermined threshold may be set by a skilled person based on experience or according to the structure of the dynamic pressure groove bottom. If the super-lubricant is a liquid, due to the fact that liquids are difficult to be compressed by large volumes, the second predetermined threshold may be set to be slightly larger than the first predetermined threshold.

For example, as shown in FIG. 3*a*, if the pressure of the super-lubricant at the dynamic pressure groove bottom is smaller than a pressure of the oil reservoir, the super-lubricant in the oil reservoir or the second reservoir ring groove may be smoothly replenished along a J→I channel into the dynamic pressure groove. A H→G channel is obstructed, and the super-lubricant in the oil reservoir or the second reservoir ring groove may not move along the H→G channel into the dynamic pressure groove.

For example, as shown in FIG. 3*b*, if the pressure of the super-lubricant at the dynamic pressure groove bottom is greater than the pressure of the oil reservoir, the excess super-lubricant 120 exceeding the capacity of the dynamic pressure groove 112 may flow into a first reservoir ring groove or the reverse Tesla valve, and the super-lubricant in the dynamic pressure groove may smoothly flow back to the oil reservoir or the second reservoir ring groove along the G→H channel under pressure. An I→J channel is obstructed, and the super-lubricant 120 in the dynamic pressure groove may not flow back to the oil reservoir or the second reservoir ring groove along the I→J channel. Positions I and G are positions where the Tesla valve structure and the oil reservoir are connected.

Figure 6:
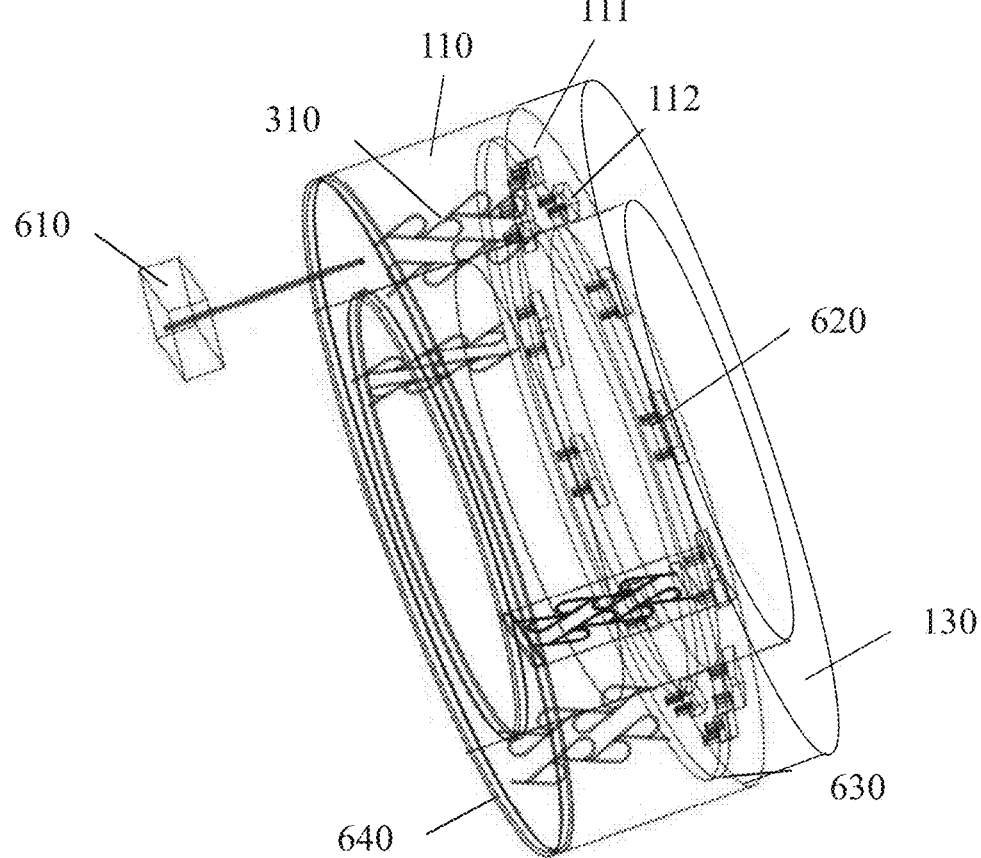
FIG. 6 is a schematic diagram of an exemplary structure of a friction pair device according to some embodiments of the present disclosure.
Figure 7:
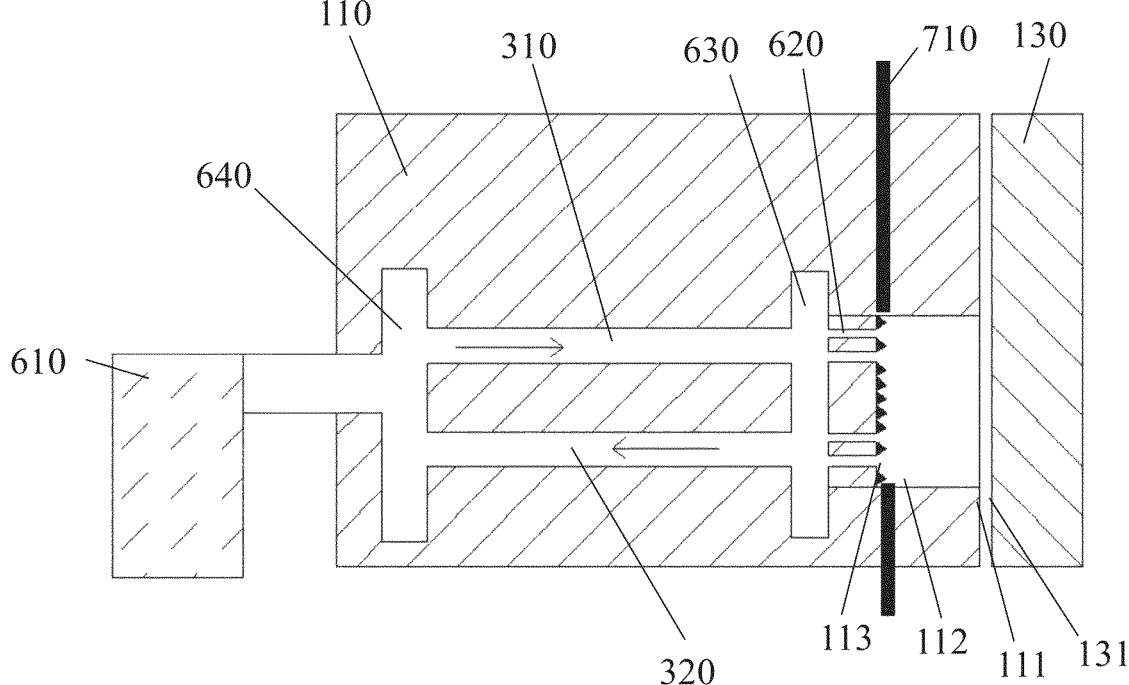
FIG. 7 is an exemplary cross-sectional view of a friction pair device according to some embodiments of the present disclosure.

More descriptions of the oil reservoir, the first reservoir ring groove, and the second reservoir ring groove may be found in FIG. 6 and FIG. 7 and the related descriptions thereof.

In some embodiments of the present disclosure, the dynamic pressure groove and the vibration of the friction pair device may cause uneven velocity and pressure distribution of a flow field in the micro-nano scale gaps, and touching abrasion of the friction pair stationary member and the friction pair moving member as well as high viscosity of the lubricating fluid may cause the temperature of the flow field to rise. Under the action of the complex flow field, the super-lubricant at the dynamic pressure groove bottom may be lost, resulting in the gradual decrease of the performance of the super slip surface. In addition, the excessive replenishment of the super-lubricant may affect the friction pair's motion state. Therefore, by real-time replenishment or recovery of the super-lubricant in the friction pair, it can ensure that the friction pair is adequately lubricated, which can reduce wear and prolong the service life of the friction pair.

The stress application device is a device that applies shear stress to molecules of the liquid medium on the super slip surface.

In some embodiments, the stress application device is configured to apply the shear stress to the liquid medium molecules by one or more of a temperature gradient, a magnetic field, or an electric field. Merely by way of example, if the stress application device is a device that applies the shear stress by the electric field, two electrodes are disposed at two ends of the dynamic pressure groove bottom, and electricity is energized to the two electrodes, thereby controlling the flow of the liquid medium molecules.

Figure 5:
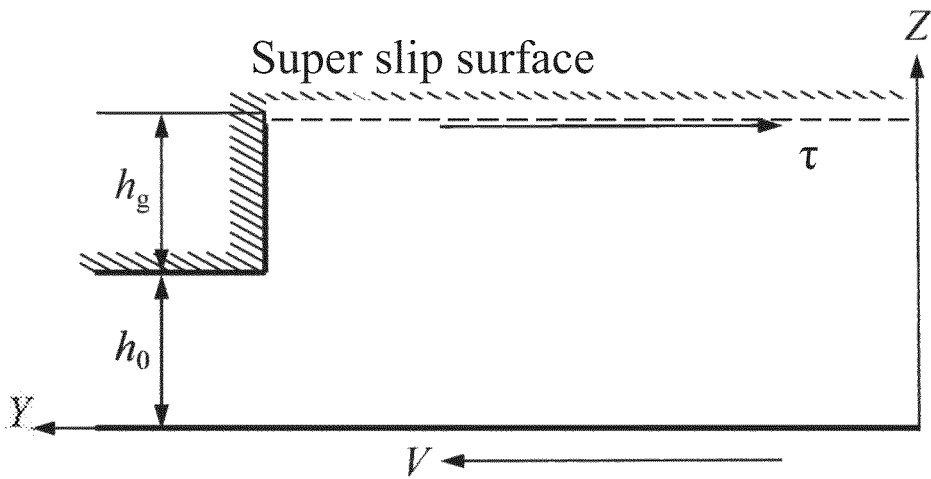
FIG. 5 is a schematic diagram of a shear stress applied to a liquid film on a surface of a dynamic pressure groove bottom in a direction opposite to a moving direction of a friction pair dynamic surface according to some embodiments of the present disclosure.

FIG. 5 is a schematic diagram of a shear stress applied to a fluid on a surface of a dynamic pressure groove bottom in a direction opposite to a moving direction of a friction pair dynamic surface according to some embodiments of the present disclosure.

In some embodiments, the stress application device may apply a shear stress to the liquid film on the surface of the dynamic pressure groove bottom in the direction opposite to the moving direction of the friction pair dynamic surface. For example, as shown in FIG. 5, the moving velocity of the friction pair dynamic surface is V and the moving direction of the friction pair dynamic surface is Y. The stress application device may apply a shear stress r in the direction (−Y) opposite to the moving direction of the friction pair dynamic surface.

In some embodiments, to generate a relatively large fluid dynamic pressure by the liquid film, a formation condition may be met. The formation condition includes maintaining a velocity difference between the friction pair moving member and the friction pair stationary member. The larger the velocity difference is, the more pronounced the fluid dynamic pressure of the liquid film is. Therefore, applying the shear stress to the liquid film on the surface of the dynamic pressure groove bottom in the direction opposite to the moving direction of the friction pair dynamic surface can induce the liquid film to generate a large fluid dynamic pressure to improve a load-bearing capacity of the liquid film.

FIG. 6 is a schematic diagram of an exemplary structure of a friction pair device according to some embodiments of the present disclosure. FIG. 7 is an exemplary cross-sectional view of a friction pair device according to some embodiments of the present disclosure In some embodiments, as shown in FIGS. 6 and 7, the friction pair device may include a friction pair stationary member 110, a plurality of micro channels 620, a Tesla valve structure (e.g., the forward Tesla valve 310 and the reverse Tesla valve 320), a stress application device (e.g., a stress application device 710 in FIG. 7), and a friction pair moving member 130.

In some embodiments, the friction pair stationary member 110 may include a friction pair static surface 111, and the friction pair static surface is provided with a dynamic pressure groove 112. The dynamic pressure groove 112 may include a dynamic pressure groove bottom 113. A surface of the dynamic pressure groove bottom 113 has micro-nano scale gaps.

In some embodiments, a plurality of micro channels 620 are in communication with the dynamic pressure groove bottom 113, and a super-lubricant may enter the dynamic pressure groove 112 through the plurality of micro channels 620.

In some embodiments, the Tesla valve structure includes the forward Tesla valve 310 and the reverse Tesla valve 320. The forward Tesla valve 310 is configured to enable a flow connection of the dynamic pressure groove bottom 113 and the micro channels 620 with an oil reservoir 610, and the reverse Tesla valve 320 is configured to enable a flow connection between the dynamic pressure groove bottom 113 and the oil reservoir 610.

In some embodiments, the friction pair moving member 130 includes a friction pair dynamic surface 131. The friction pair dynamic surface 131 is in contact with the friction pair static surface 111. It should be noted that in order to differentiate the friction pair dynamic surface 131 from the friction pair static surface 111, there is a gap between the friction pair dynamic surface 131 and the friction pair static surface 111 in FIG. 7. The gap is very small and the friction pair dynamic surface 131 is in contact or approximate contact with the friction pair static surface 111. When the friction pair is at a standstill or at a relatively low velocity, the friction pair dynamic surface 131 is in contact with the friction pair static surface 111; when a relative velocity of the friction pair is relatively high, a liquid film is formed between the friction pair dynamic surface 131 and the friction pair static surface 111. A thickness of the liquid film may be at micrometer level.

In some embodiments, the friction pair device may also include a first reservoir ring groove 630 and a second reservoir ring groove 640.

The first reservoir ring groove 630 refers to a groove for replenishment or recovery of the super-lubricant 120 to the dynamic pressure groove bottom 113 or the plurality of micro channels 620. In some embodiments, the first reservoir ring groove 630 is disposed on an inner side of the friction pair stationary member 110. For example, the first reservoir ring groove 630 may be disposed on the friction pair static surface 111. As another example, the first reservoir ring groove 630 is disposed between the micro channels 620 and the reverse Tesla valve 320 (as shown in FIG. 7).

The second reservoir ring groove 640 refers to a groove for storing the recovered super-lubricant 120. In some embodiments, the second reservoir ring groove 640 is disposed on a side of the friction pair stationary member away from the dynamic pressure groove. For example, the first reservoir ring groove 630 is provided between the forward Tesla valve 310 and the oil reservoir 610 (as shown in FIG. 7).

In some embodiments, the first reservoir ring groove 630 and the second reservoir ring groove 640 are in communication with the plurality of micro channels 620, allowing for simultaneous replenishment or recovery of the super-lubricant to the plurality of circumferentially arranged micro channels.

In some embodiments, when an amount of the super-lubricant 120 at the dynamic pressure groove bottom 113 is less than a first predetermined threshold, the super-lubricant 120 flows sequentially from the oil reservoir 610 into the second reservoir ring groove 640, the forward Tesla valve 310, the first reservoir ring groove 630, the micro channels 620, and the dynamic pressure groove bottom 113.

In some embodiments, when the amount of the super-lubricant 120 at the dynamic pressure groove bottom 113 is greater than a second predetermined threshold, the super-lubricant 120 flows sequentially from the dynamic pressure groove bottom 113 into the micro channels 620, the first reservoir ring groove 630, the reverse Tesla valve 320, the second reservoir ring groove 640, and the oil reservoir 610. See FIG. 4 for more description of the first predetermined threshold, the first predetermined threshold, and replenishment and recovery of the super-lubricant.

In some embodiments of the present disclosure, by providing the reservoir ring grooves (e.g., the first reservoir ring groove 630 and the second reservoir ring groove 640), the super-lubricant in the plurality of micro channels arranged in a circumferential direction can be replenished or recovered simultaneously, which facilitates the recovery and replenishment of the super-lubricant to keep the dynamic pressure groove bottom of the friction pair static surface in the super-slip state.

Figure 8:
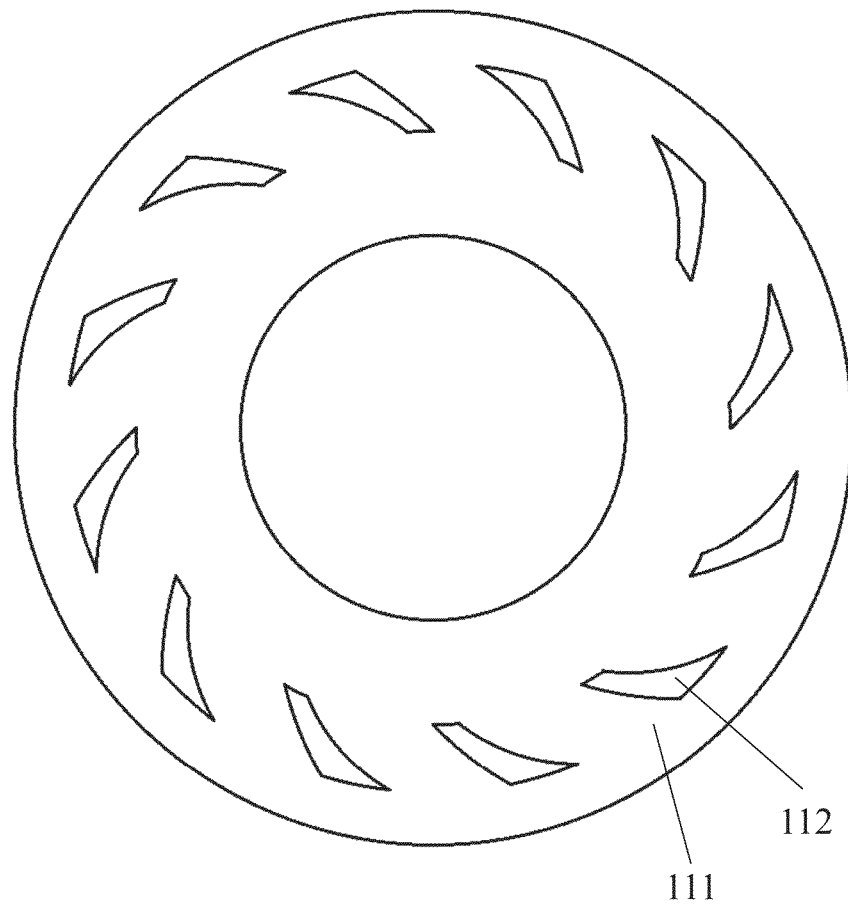
FIG. 8 is a schematic diagram of an exemplary dynamic pressure groove according to some embodiments of the present disclosure.

FIG. 8 is a schematic diagram of an exemplary dynamic pressure groove according to some embodiments of the present disclosure.

In some embodiments, a count of the dynamic pressure groove is one. In some embodiments, as shown in FIG. 8, at least two dynamic pressure grooves are disposed on a friction pair static surface of a friction pair stationary member, and a distance between any two of the at least two dynamic pressure grooves is greater than 0. The distance between any two of the at least two dynamic pressure grooves being greater than 0 indicates that the at least two dynamic pressure grooves are separated from each other.

In some embodiments of the present disclosure, by providing a plurality of relatively independent dynamic pressure grooves, it is possible to increase a dynamic pressure-load-bearing capacity of the super-lubricant and the liquid film and form the super slip surface, thereby enabling the friction pair device to function with high load and low friction.

In some embodiments, if the friction pair device is circular, as shown in FIG. 8, the dynamic pressure grooves 112 are spiral in shape, with at least two of dynamic pressure grooves 112 distributed along a circular circumference. The friction pair device is circular means that the shape of a contacting surface of the friction pair (e.g., at least one of the friction pair static surface 111 and the friction pair dynamic surface 131) is circular. In some embodiments, the count of the dynamic pressure grooves 112 is 4, 8, or 12. Preferably, the count of the dynamic pressure grooves 112 is 10 to 12. The dynamic pressure grooves 112 are evenly distributed along a circular circumference (e.g., a circumference of the circular friction pair static surface 111).

In some embodiments, if the friction pair is circular and the dynamic pressure grooves are provided along the circular circumference, an arc of a single groove on the circular circumference is less than $2\pi$ radians (360°). For example, if the friction pair is circular or annular, the dynamic pressure grooves may not be configured as annular through grooves. If the dynamic pressure grooves are configured as annular through grooves, when liquid medium molecules of the super-lubricant are dragged by the friction pair dynamic surface, the force transitions from dynamic pressure to static pressure, making it impossible to form a super-slip surface.

In some embodiments of the present disclosure, if the friction pair is circular, providing a plurality of spiral dynamic pressure grooves uniformly along the circumference can improve the effect of the super slip surface of the friction pair and further reduce friction energy consumption.

In some embodiments of the present disclosure, by setting the plurality of relatively independent dynamic pressure grooves, a plurality of wedge-shaped spaces can be formed on the friction pair static surface, so that the super-lubricant layer formed by the super-lubricant and the liquid film can have a relatively large momentum, thus providing a strong load-bearing capacity. By applying a shear stress to the super-lubricant layer on the surface of the dynamic pressure groove bottom, the slip velocity of the liquid medium molecules on the surface of the dynamic pressure groove bottom can approach the moving velocity of the friction pair dynamic surface, further increasing the load-bearing capacity of the super-lubricant layer and the liquid film, and reducing friction in the friction pair. By providing the micro channels and the Tesla valve structure, the super-lubricant in the friction pair can continuously maintained in an optimal state with an appropriate amount, so as to make the super-lubricant layer and the liquid film remain in the super-slip state. Based on the above design, the super-lubricant layer formed by the super-lubricant and the liquid film can exhibit fluid dynamic pressure while experiencing minimal friction loss, thus enhancing the load-bearing capacity of the friction pair and reducing friction within the friction pair.

Figure 9:
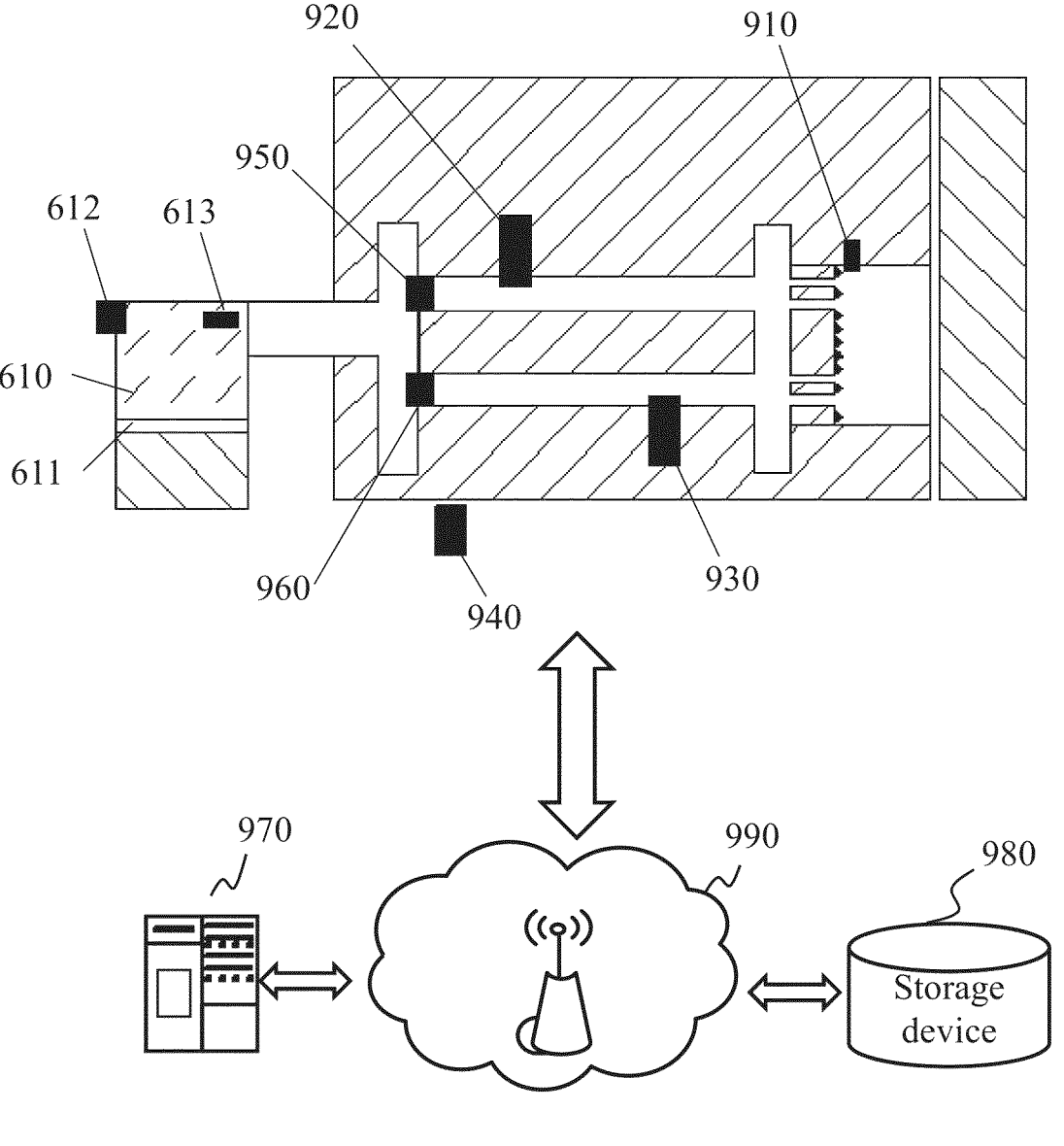
FIG. 9 is another exemplary schematic diagram of a friction pair device according to some embodiments of the present disclosure.

FIG. 9 is another exemplary schematic diagram of a friction pair device according to some embodiments of the present disclosure.

In some embodiments, the friction pair device further includes a temperature sensor 910, a first pressure sensor 920, and a second pressure sensor 930, as shown in FIG. 9.

The temperature sensor is a sensing device for detecting temperature. For example, the temperature sensor includes a thermocouple, an infrared temperature sensor, or the like. In some embodiments, the temperature sensor 910 is provided at a dynamic pressure groove and configured to monitor temperature data of the dynamic pressure groove.

The pressure sensor is a sensing device for detecting pressure. For example, the pressure sensor may include a piezo-resistive pressure sensor, etc. In some embodiments, the first pressure sensor 920 is disposed at a forward Tesla valve and configured to obtain a replenishment pressure. The second pressure sensor 930 is disposed at a reverse Tesla valve and configured to obtain a recovery pressure.

The replenishment pressure is the pressure of a super-lubricant in a replenishment channel. The recovery pressure is the pressure of the super-lubricant in a recovery channel. In some embodiments, the replenishment pressure and the recovery pressure may be represented by sequence data including pressures collected at multiple time points, i.e., the replenishment pressure and the recovery pressure may be represented by a replenishment pressure sequence and a recovery pressure sequence, respectively. The replenishment pressure sequence and the recovery pressure sequence represent pressure data acquired by the first pressure sensor and the second pressure sensor at a current time point and in a predetermined time period preceding the current time point. The duration of the predetermined time period may be a default period or set by a technician. Merely by way of example, the replenishment pressure and the recovery pressure are the pressure sequence data acquired by the first pressure sensor and the second pressure sensor at the current time point and within the last 3 minutes before the current time point.

In some embodiments, as shown in FIG. 9, an electric piston 611 is disposed at a bottom portion of the oil reservoir 610. The electric piston 611 is configured to apply a forward pressure or a reverse suction force to the super-lubricant in the oil reservoir 610. For example, when the electric piston 611 moves toward the friction pair device, the electric piston 611 applies a forward pressure on the super-lubricant, pushing the super-lubricant toward an interior of the friction pair device. When the electric piston 611 moves away from the friction pair device, the electric piston 611 applies a reverse suction force to the super-lubricant, driving the super-lubricant toward the oil reservoir 610.

In some embodiments, the electric piston 611 may operate based on a movement parameter. More descriptions may be found in related descriptions below.

In some embodiments, the oil reservoir 610 may include a replenishment inlet 612 and an oil level sensor 613.

The replenishment inlet 612 is an inlet through which the super-lubricant is replenished into the oil reservoir 610. For example, when there is insufficient super-lubricant in the oil reservoir 610, an external device or an operator may replenish super-lubricant into the oil reservoir 610 through the replenishment inlet 612.

The oil level sensor 613 refers to a sensing device for detecting a height of the super-lubricant in the oil reservoir 610 to measure the amount of oil stored in the oil reservoir 610. For example, the oil level sensor 613 includes an ultrasonic level sensor or the like.

In some embodiments, the friction pair device further comprises a vibration sensor 940, as shown in FIG. 9. The vibration sensor 940 is configured to obtain a vibration characteristic of the friction pair device.

The vibration sensor 940 refers to a sensing device for detecting vibrations. For example, the vibration sensor 940 includes an acceleration sensor, a piezoelectric vibration sensor, or the like. The vibration characteristic is a characteristic that reflects a vibration condition of the friction pair device. In some embodiments, the vibration sensor 940 is disposed on an outer side of the friction pair device (e.g., an outer side of the friction pair stationary member 110).

In some embodiments, the friction pair device further includes a first solenoid valve 950 and a second solenoid valve 960.

A solenoid valve is a device that controls the flow of a fluid by electromagnetic control. In some embodiments, the first solenoid valve 950 is disposed at a junction between the oil reservoir and the forward Tesla valve, and configured to control a connection and a disconnection between the oil reservoir and the forward Tesla valve. The second solenoid valve 960 is disposed at a junction between the oil reservoir and the reverse Tesla valve, and configured to control a connection and a disconnection between the oil reservoir and the reverse Tesla valve.

In some embodiments, the friction pair device further includes a processing device 970 and a storage device 980. Each of the processing device 970 and the storage device 980 is communicatively connected to one or more of the temperature sensor, the second pressure sensor, the electric piston, the vibration sensor, the first solenoid valve, and the second solenoid valve to enable transfer and exchange of information and/or data between various components. For example, the temperature sensor and the first pressure sensor may send the temperature data and the recovery pressure to the processing device and the storage device. As another example, the processing device may send the movement parameter to the electric piston. The communicative connection may include connecting via a network 990, such as a local area network LAN, Bluetooth, or the like.

The processing device 970 is configured to process data from at least one component of the friction pair device or an external data source. For example, the processing device may acquire and analyze the vibration characteristic captured by the vibration sensor. As another example, the processing device may acquire and process opening and closing data of the first solenoid valve and the second solenoid valve.

In some embodiments, the processing device 970 may include a central processing unit (CPU), an application-specific integrated circuit (ASIC), an application-specific instruction set processing device (ASIP), etc., or any combination thereof.

The storage device 980 refers to a device having a storage function. In some embodiments, the storage device may be used to store data, instructions, and/or any other information. In some embodiments, the storage device may be used to store data and/or information during the processing device processing, such as the temperature data, the replenishment pressure, the recovery pressure, the vibration characteristic, or the like.

In some embodiments, the storage device may include one or more storage components, each of which may be a stand-alone device or may be part of another device. In some embodiments, the storage device may include random access storage device (RAM), read-only storage device (ROM), or the like.

More descriptions of this section may be found in related descriptions below.

Some embodiments of the present disclosure also provide a liquid film sealing device, the liquid film sealing device comprising the friction pair device of the various embodiments described above.

Figure 10A:
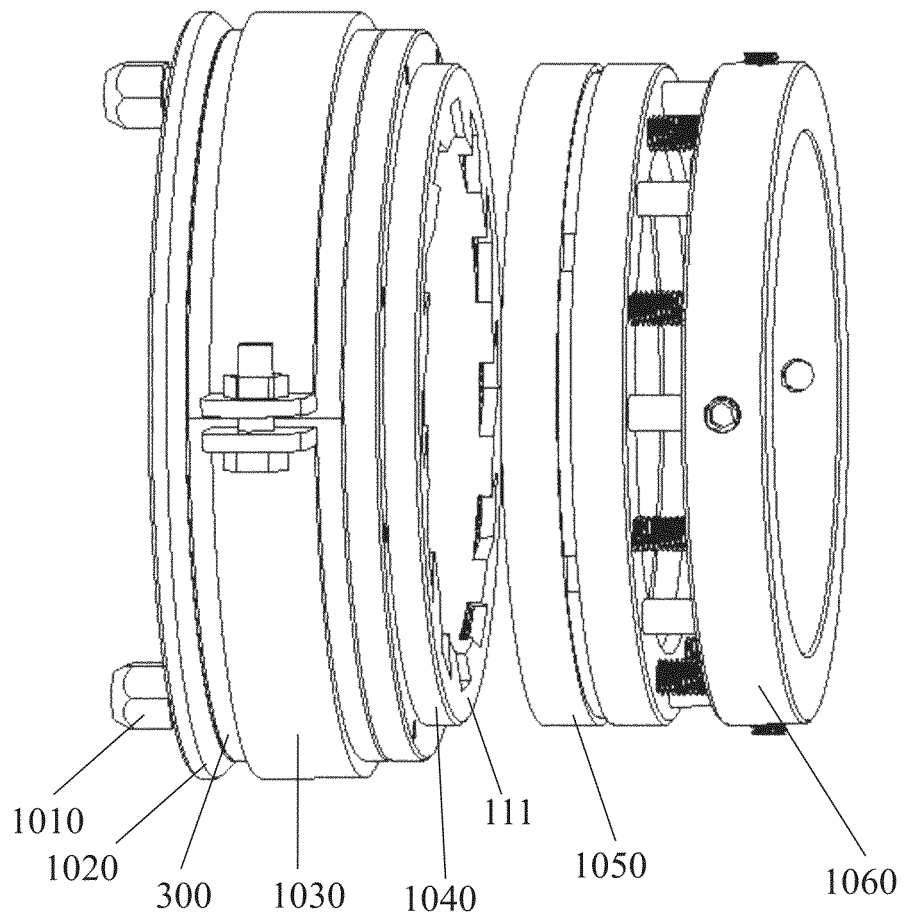
FIG. 10a is a schematic diagram of an exemplary structure of a liquid film sealing device according to some embodiments of the present disclosure.
Figure 10B:
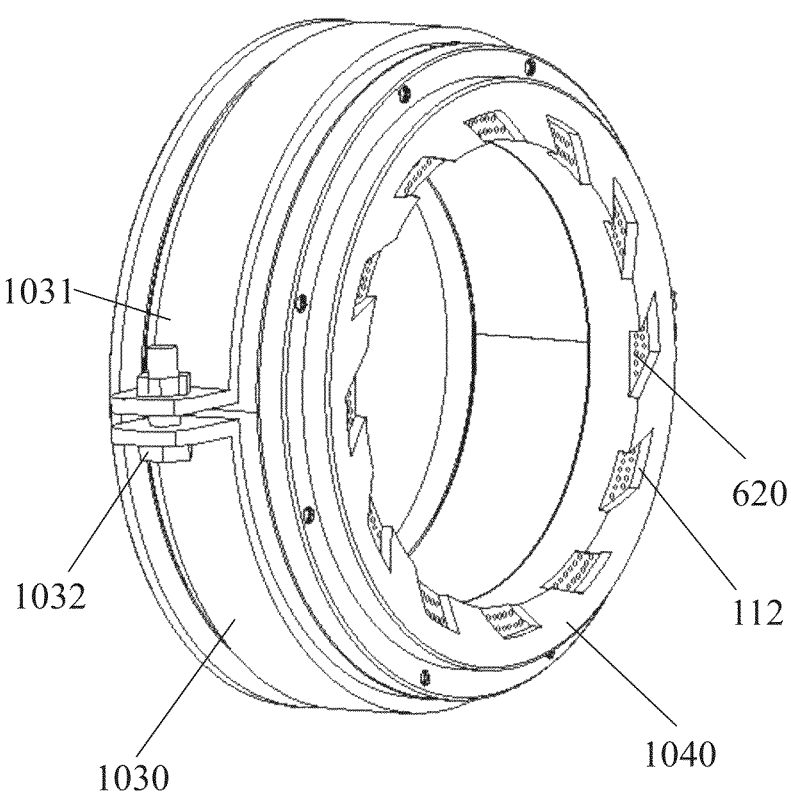
FIG. 10b is a schematic diagram of an exemplary structure of a friction pair stationary member according to some embodiments of the present disclosure.
Figure 10C:
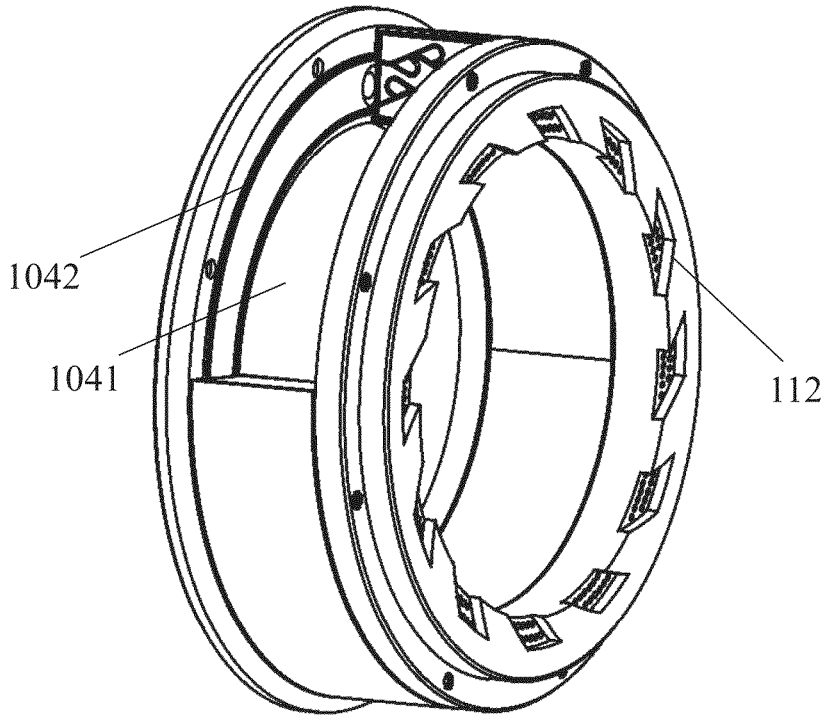
FIG. 10c is a schematic diagram of another exemplary structure of a friction pair stationary member according to some embodiments of the present disclosure.
Figure 10D:
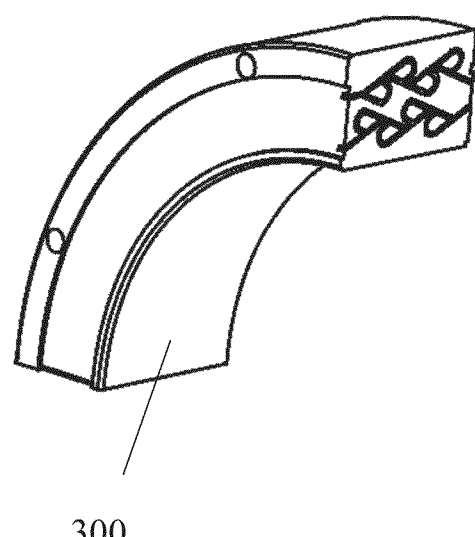
FIG. 10d is a schematic diagram of an exemplary a Tesla valve structure according to some embodiments of the present disclosure.

FIG. 10*a* is a schematic diagram of an exemplary structure of a liquid film sealing device according to some embodiments of the present disclosure. FIG. 10*b* is a schematic diagram of an exemplary structure of a friction pair stationary member according to some embodiments of the present disclosure. FIG. 10*c* is a schematic diagram of another exemplary structure of a friction pair stationary member according to some embodiments of the present disclosure. FIG. 10*d* is a schematic diagram of an exemplary a Tesla valve structure according to some embodiments of the present disclosure.

In some embodiments, as shown in FIG. 10*a*, the liquid film sealing device comprises an oil pipe connector 1010, a pressure plate 1020, a Tesla valve structure 300, a fixing member 1030, a static ring 1040, a dynamic ring 1050, and a compensation seat 1060. The oil pipe connector 1010 is disposed on an outer side of the pressure plate 10020. The pressure plate 1020 is fixedly connected to the Tesla valve structure 300. The fixing member 1030 is configured to secure a plurality of Tesla valve structures 300 as a whole. The dynamic pressure groove 112 is disposed on the static ring 1040. The dynamic ring 1050 is disposed on the compensation seat 1060.

In some embodiments, the friction pair stationary member includes the pressure plate 1020, the Tesla valve structure 300, the fixing member 1030, and the static ring 1040. The friction pair moving member includes the dynamic ring 1050 and the compensation seat 1060. The friction pair moving member may rotate relative to the friction pair stationary member.

The oil pipe connector 1010 is configured to be in communication with the oil reservoir 610. For example, the oil pipe connector 1010 is in communication with the replenishment inlet 612 of the oil reservoir 610 (see FIG. 9) via a pipe.

The pressure plate 1020 is configured to close a channel through which the super-lubricant flows to an external environment. For example, when the Tesla valve structure 300 is provided with the second reservoir ring groove 640 close to the oil reservoir, the pressure plate 1020 is disposed on an outer side of the second reservoir ring groove 640, preventing the super-lubricant in the second reservoir ring groove 640 from flowing outside of the friction pair device. The pressure plate 1020 is fixedly connected (e.g., bolted, welded, etc.) to the Tesla valve structure 300.

In some embodiments, the liquid film sealing device is provided with a plurality of Tesla valve structures 300, as shown in FIGS. 10*b* to 10*d*. Merely by way of example, the liquid film sealing device is provided with four Tesla valve structures 300, each of which is configured as a shape of a ¼ circle (as shown in FIG. 10*b*). Visible surfaces of two ends of the each Tesla valve structure 300 are provided with grooves corresponding to the Tesla valve structure 300. When the plurality of Tesla valve structures 300 are combined, the grooves of two neighboring Tesla valve structures 300 are in contact with each other to form a sealing space. Providing the grooves on the Tesla valve structures 300 is convenient for manufacturing and processing.

The fixing member 1030 refers to a device that secures the Tesla valve structures 300. In some embodiments, the fixing member 1030 secures the Tesla valve structures 300 into a circular shape by bolting, etc. In some embodiments, the fixing member 1030 includes a hose hoop 1031 and a bolt 1032, wherein the hose hoop 1031 connects the four Tesla valve structures 300 into a complete circle, and the bolt 1032 secures the hose hoop 1031 securing the ends of the hose hoop 1031.

The static ring 1040 refers to a component that provides a dynamic pressure groove. In some embodiments, the plurality of Tesla valve structures 300 surround an outer side of the static ring 1040. Merely by way of example, the static ring 1040 has a stepped characteristic 1041 (as shown in FIG. 10*c*), an inner diameter of each of the plurality of Tesla valve structures 300 fits an outer diameter of the stepped characteristic 1041, and the plurality of Tesla valve structures 300 are secured to the static ring 1040 through screws, bolts, welds, or the like. In some embodiments, the pressure plate 1020, the Tesla valve structures 300, and the static ring 1040 are fixed as a whole through screws, or the like.

In some embodiments, the static ring 1040 further includes a sealing ring 1042, as shown in FIG. 10*c*. The sealing ring 1042 is configured to seal the liquid film sealing device. In some embodiments, the static ring 1040 includes a plurality of sealing rings 1042. The plurality of sealing rings 1042 are disposed at an inlet and an outlet of the Tesla valve structure. Merely by way of example, when the forward Tesla valve and the reverse Tesla valve are arranged at different positions on a circumference of a circular friction pair, a set of sealing rings 1042 are disposed at two ends of the position of the forward Tesla valve on the circumference, and a set of sealing rings 1042 are disposed at two ends of the position of the reverse Tesla valve on the circumference. This arrangement ensures that leakage of the super-lubricant is avoided at a connection between the Tesla valve structure and the pressure plate or a connection between the Tesla valve structure and the dynamic ring. In some embodiments, the sealing rings are provided if the static ring is screw-secured to the Tesla valve structure; if the static ring is welded-secured to the Tesla valve structure, the sealing rings are not required.

The dynamic ring 1050 is a component of the liquid film sealing device used to compensate for displacement. For example, when the dynamic ring 1050 is slightly displaced due to factors such as temperature changes or operating pressure, a thickness of the liquid film between the dynamic ring 1050 and the friction pair stationary member 110 may change accordingly (e.g., the Tesla valve structure 300 makes adaptive adjustments to the super-lubricant in the dynamic pressure groove 112 or the friction pair static surface 111), and the displacement of the dynamic ring 1050 after the change of the thickness of the liquid film is compensated. The compensation for the displacement of the dynamic ring 1050 ensures that sealing end surfaces of the liquid film sealing device are always in close contact (there is a micron-thick liquid film between the sealing end faces).

The compensation seat 1060 refers to a component of the liquid film sealing device that provides a fixed or stabilized position to the dynamic ring 1050. In some embodiments, the compensation seat 1060 and the dynamic ring 1050 are connected to each other by a resilient member (e.g., a spring). As an example only, the compensation seat 1060 is fixed to an external component, and the friction pair stationary member 110 is fixed externally. The relative displacement between the dynamic ring 1050 and the friction pair stationary member 110 is compensated by the friction pair device. The relative displacement between the dynamic ring 1050 and the compensation seat 1060 is compensated by the elastic member.

Figure 10E:
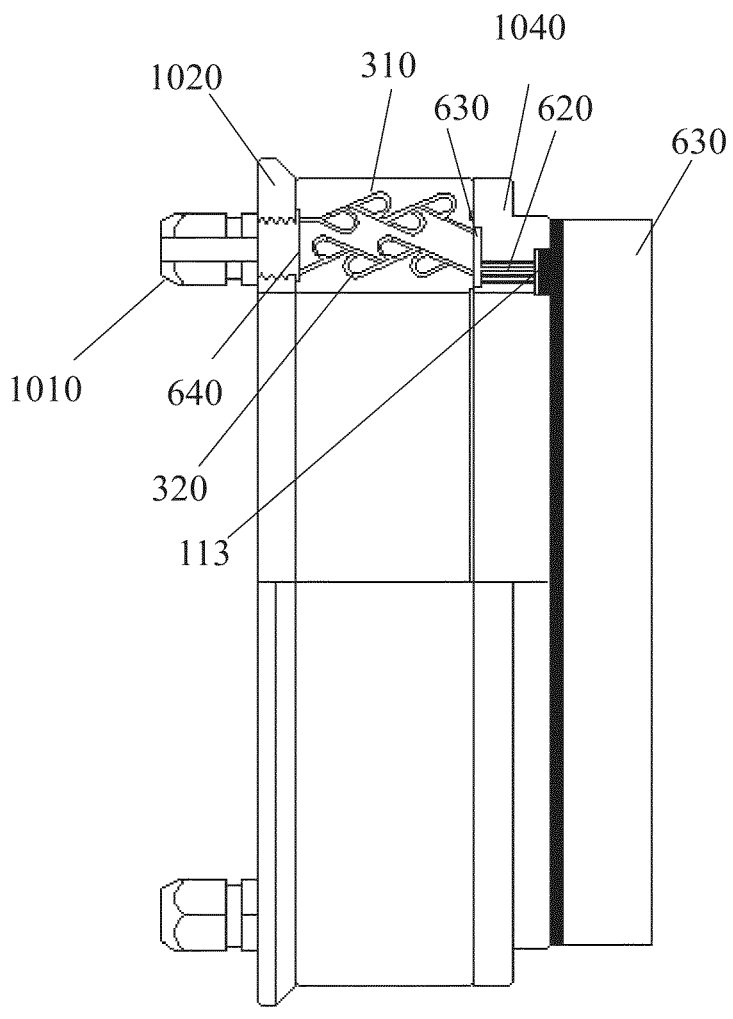
FIG. 10e is an exemplary cross-sectional view of a liquid film sealing device according to some embodiments of the present disclosure.

FIG. 10*e* is an exemplary cross-sectional view of a liquid film sealing device according to some embodiments of the present disclosure.

In some embodiments, as shown in FIG. 10*e*, when the amount of the super-lubricant 120 at the dynamic pressure groove bottom 113 is less than a first predetermined threshold, the super-lubricant 120 flows sequentially from the oil reservoir 610 into a fluid channel within the oil pipe connector 1010, a fluid channel within the pressure plate 1020, the second reservoir ring groove 640, the forward Tesla valve 310, the first reservoir ring groove 630, the micro channels 620 provided on the static ring 1040, and the dynamic pressure groove bottom 113 provided on the static ring 1040, and the super-lubricant at the dynamic pressure groove bottom 113 is replenished.

In some embodiments, when the amount of the super-lubricant 120 at the dynamic pressure groove bottom 113 is greater than a second predetermined threshold, the super-lubricant 120 flows sequentially from the dynamic pressure groove bottom 113 into the micro channels 620, the first reservoir ring groove 630, the reverse Tesla valve 320, the second reservoir ring groove 640, the fluid channel within the pressure plate 1020, and the fluid channel within the oil pipe connector 1010, and the excess super-lubricant at the dynamic pressure groove bottom 113 is recovered.

More descriptions of the first predetermined threshold, the second predetermined threshold, and the replenishment and recovery of the super-lubricant may be found in FIG. 4 and the related descriptions thereof.

In some embodiments, the processing device 970 may be configured to: determine a movement parameter of the electric piston 611 based on the replenishment pressure and the recovery pressure via a movement parameter model, and control an operation of the electric piston based on the movement parameter. The movement parameter model may be a machine learning model stored in a storage device.

The movement parameter of the electric piston is an operating parameter for the movement of the electric piston. In some embodiments, the movement parameter includes a moving direction, a moving velocity, a moving distance of the electric piston, a pressure exerted by the electric piston, or the like. The moving direction includes a direction towards the friction pair device and a direction away from the friction pair device. The pressure exerted by the electric piston includes a forward pressure, a reverse suction force, etc., to the super-lubricant. For example, the movement parameter of the electric piston includes moving closer to the friction pair device by 1 cm, applying a forward pressure of 1 kPa to the super-lubricant in the oil reservoir, or the like.

In some embodiments, the movement parameter model may include a machine learning model, a predetermined algorithm, or the like. Merely by way of example, the predetermined algorithm includes that when the replenishment pressure and the recovery pressure are below a first pressure threshold, the movement parameter of the electric piston includes the moving direction towards the friction pair and applying the forward pressure on the super-lubricant in the oil reservoir. The magnitude of the applied pressure may be predetermined. As another example, the predetermined algorithm includes that when the replenishment pressure and the recovery pressure are higher than a second pressure threshold, the movement parameter of the electric piston includes the moving direction away from the friction pair and applying the reverse suction force to the super-lubricant. The magnitude of the reverse suction force may be predetermined. The first pressure threshold and the second pressure threshold may be predetermined by a technician or set by default, and the second pressure threshold is greater than the first pressure threshold. When the replenishment pressure and the recovery pressure are lower than the first pressure threshold, it indicates that there may be insufficient super-lubricant at the dynamic pressure groove bottom, then it is necessary to increase the amount of the super-lubricant. Therefore the forward pressure is applied to the super-lubricant in the oil reservoir to make the super-lubricant flow into the dynamic pressure groove. Similarly, when the replenishment pressure and the recovery pressure are higher than the second pressure threshold, it indicates that there is excessive super-lubricant at the dynamic pressure groove bottom, then it is necessary to reduce the amount of the super-lubricant at the dynamic pressure groove bottom. Therefore the reverse suction force is exerted on the super-lubricant in the oil reservoir to reduce the amount of the super-lubricant in the dynamic pressure groove.

Figure 11:
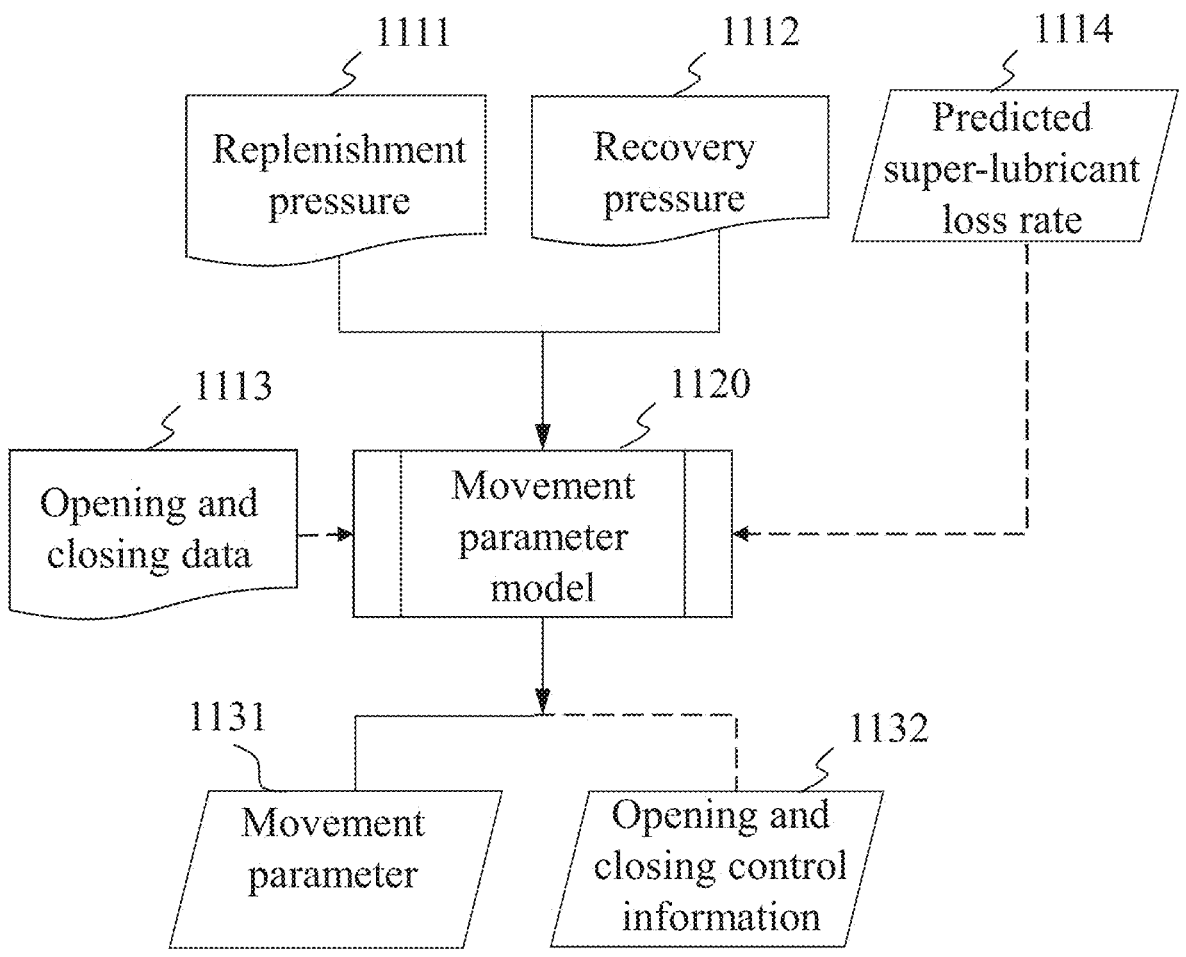
FIG. 11 is a block diagram of an exemplary movement parameter model according to some embodiments of the present disclosure.

FIG. 11 is a block diagram of an exemplary movement parameter model according to some embodiments of the present disclosure.

A movement parameter model 1120 refers to a model for determining a movement parameter. In some embodiments, the movement parameter model 1120 may be a machine learning model, e.g., a Deep Neural Network (DNN) model, or the like. In some embodiments, a trained movement parameter model may be pre-uploaded to a storage device by a technician and then retrieved by a processing device (e.g., the processing device 970).

In some embodiments, as illustrated in FIG. 11, an input of the movement parameter model 1120 includes a replenishment pressure 1111 and a recovery pressure 1112. An output of the movement parameter model 1120 includes a movement parameter 1131 of an electric piston 611. In some embodiments, the processing device may obtain the replenishment pressure 1111 and the recovery pressure 1112 in multiple ways. For example, the processing device may obtain the replenishment pressure and the recovery pressure respectively through a first pressure sensor (e.g., the first pressure sensor 920) and a second pressure sensor (the second pressure sensor 93) that are in a communication connection with the processing device.

In some embodiments, a first training sample for training the movement parameter model 1120 includes preferred historical data. The preferred historical data refers to historical data in which a historical replenishment pressure and a historical recovery pressure satisfy a predetermined condition.

In some embodiments, the predetermined condition includes that pressure values in a replenishment pressure sequence and a recovery pressure sequence in the historical data are maintained within a predetermined range for a predetermined time period. The predetermined time period is a pre-set time period, such as 5 min, 10 min, or the like. The predetermined range is a pre-set pressure range. The predetermined time period and the predetermined range may be pre-set by a technician or set by system default. More descriptions of the replenishment pressure sequence and the recovery pressure sequence may be found in FIG. 9 and the related descriptions thereof.

In some embodiments, the predetermined time period is negatively correlated to a consumption rate of the super-lubricant. For example, if the consumption rate of the super-lubricant is relatively slow and the super-lubricant does not need to be replenished often, the replenishment pressure and the recovery pressure are easy to be maintained within the predetermined range, then the predetermined time period is set to be a relatively long time period.

In some embodiments, the processing device may use a historical actual movement parameter corresponding to the preferred historical data as a first label of the first training sample.

In some embodiments, the processing device may construct a first loss function based on the movement parameter and the first label output from the movement parameter model, iteratively update a parameter of the movement parameter model using the first loss function, and obtain a trained movement parameter model through the parameter update. Techniques for updating the parameter of the movement parameter model may include gradient descent, etc. A condition for completion of the updating may be include the first loss function being less than a first threshold, the first loss function converging, a training period reaching a threshold, etc., or any combination thereof. In some embodiments, the training of the movement parameter model may be conducted on a remote server or an external server. The trained movement parameter model may be stored in a storage device to save the computation power of the processing device.

In some embodiments, in the training of the movement parameter model, the processing device may statistically analyze on a sample replenishment pressure and a sample recovery pressure, and determine a learning rate of the first training sample based on a statistical result.

Merely by way of example, for each first training sample, the processing device may be configured to separately count a variance of pressure values of sample replenishment pressures and a variance of pressure values of sample recovery pressures to obtain two pressure variances; determine an average of the two pressure variances as the statistical result; and determine the learning rate of the first training sample based on the average of the two pressure variances. The variance may be replaced with other statistical metrics such as standard deviation.

In some embodiments, the learning rate of the first training sample is negatively correlated with the statistical result. For example, the larger the statistical result (i.e., the average of the two pressure variances) is, the smaller the learning rate is.

In some embodiments, the processing device may determine the learning rate of the first training sample based on a first predetermined control table. The first predetermined control table includes the statistics with the corresponding learning rate for the first training sample. The first predetermined control table may be constructed by a person skilled in the art based on experience.

In some embodiments of the present disclosure, when the friction pair device is in operation, the actual flow of the super-lubricant is complex. At this time, the measured replenishment pressure or recovery pressure may be varied. The larger the statistical result (e.g., the average of the two pressure variances) is, the closer the first training sample is to the real situation, and the richer the data content contained in the first training sample. Therefore, designing a smaller learning rate can avoid missing an optimal solution for the movement parameter model.

In some embodiments, the processing device converts the movement parameter to a control parameter of the electric piston through techniques such as proportional-integral-derivative (PID) control, state-space control, or the like, and the electric piston operates based on the control parameter.

In some embodiments of the present disclosure, the movement parameter of the electric piston is determined based on the replenishment pressure and the recovery pressure obtained in the Tesla valve structure (e.g., the forward Tesla valve and the reverse Tesla valve), which enables precise control of the super-lubricant, thereby enabling timely replenishment and reduction of the super-lubricant, so that the friction pair can be maintained in a super-slip state.

In some embodiments, the input of the movement parameter model 1120 includes opening and closing data 1113 of the first solenoid valve and the second solenoid valve, as illustrated in FIG. 11.

The opening and closing data 1113 refers to data of whether the first solenoid valve and the second solenoid valve are closed or open. In some embodiments, the processing device may obtain the opening and closing data 1113 in multiple ways. For example, the processing device may obtain the opening and closing data 1113 by obtaining operation data of the first solenoid valve and the second solenoid valve via a communication connection.

In some embodiments of the present disclosure, the opening and closing data of the first solenoid valve and the second solenoid valve may affect the movement parameter. For example, when the first solenoid valve is closed, if the movement parameter model outputs a movement parameter to supply the super-lubricant, the super-lubricant may not flow into the dynamic pressure groove and complete the supply at the dynamic pressure groove bottom when the first solenoid valve is closed. Therefore, inputting the opening and closing data to the movement parameter model can improve the accuracy of the movement parameter model in determining the movement parameter.

In some embodiments, the input of the movement parameter model 1120 further includes a predicted super-lubricant loss rate 1114, as shown in FIG. 11.

The predicted super-lubricant loss rate 1114 is a predicted rate of the loss of the super-lubricant from the dynamic pressure groove or the dynamic pressure groove bottom. In some embodiments, the processing device may determine the predicted super-lubricant loss rate by an evaluation model based on the vibration characteristic, the replenishment pressure, the recovery pressure, and the temperature data. More descriptions of determining the predicted super-lubricant loss rate may be found in related descriptions below.

In some embodiments of the present disclosure, the predicted super-lubricant loss rate may also affect the movement parameter. Therefore, inputting the predicted super-lubricant loss rate to the movement parameter model can improve the accuracy of the movement parameter model in determining the movement parameter.

In some embodiments, as shown in FIG. 11, the output of the movement parameter model 1120 includes opening and closing control information 1132. The first solenoid valve and the second solenoid valve operate based on the opening and closing control information 1132.

The opening and closing control information 1132 refers to information for controlling the opening or closing of the first solenoid valve and the second solenoid valve. Merely by way of example, the opening and closing control information 1132 includes instructing the first solenoid valve to open and the second solenoid valve to close.

In some embodiments of the present disclosure, the opening and closing control information is determined by the movement parameter model, which can integrate multiple influencing factors to enhance the reliability of determining the opening and closing control information.

In some embodiments, the first training sample may further includes at least one of sample opening and closing data and a sample predicted super-lubricant loss rate, and the first label may further include historical actual opening and closing control information corresponding to the first training sample. The movement parameter model is trained based on the first training sample and the first label. The training manner is similar to the training manner described above, and is not repeated herein.

In some embodiments of the present disclosure, based on the replenishment pressure, the recovery pressure, the opening and closing data, and the predicted super-lubricant loss rate, the movement parameter model can accurately and quickly determine the movement parameter and the opening and closing control information, which facilitates the accurate control of the electric piston, the first solenoid valve and the second solenoid valve, thereby enabling the friction pair to remain in the super-slip state.

In some embodiments, the processing device is configured to: determine the predicted super-lubricant loss rate of the super-lubricant at the dynamic pressure groove bottom by an evaluation model based on the vibration characteristic, the replenishment pressure, the recovery pressure, and the temperature data.

Figure 12:
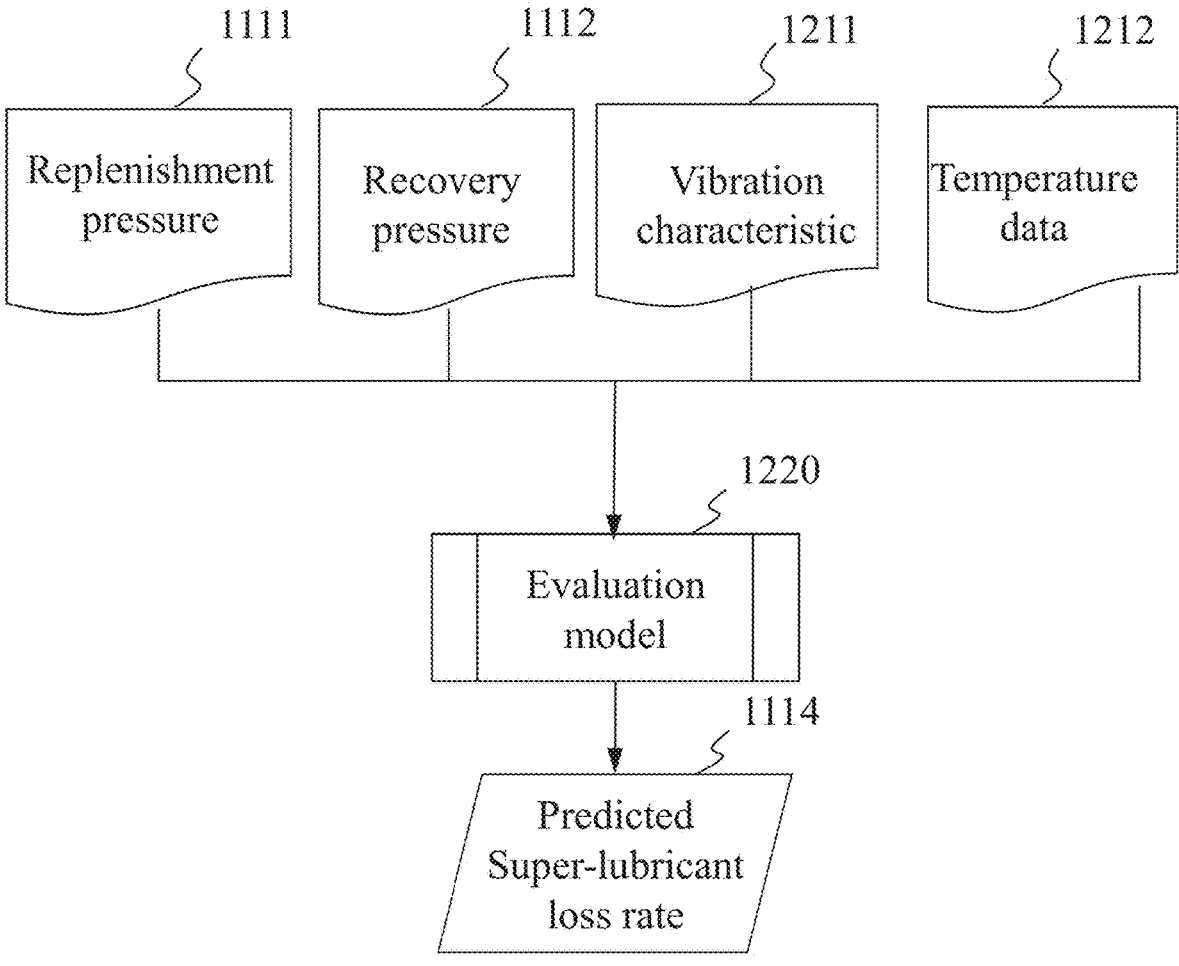
FIG. 12 is a block schematic diagram of an exemplary evaluation model according to some embodiments of the present disclosure.

FIG. 12 is a block diagram of an exemplary evaluation model according to some embodiments of the present disclosure.

An evaluation model 1220 refers to a model for determining the predicted super-lubricant loss rate. In some embodiments, the evaluation model 1220 may be a machine learning model, for example, a Deep Neural Network (DNN) model, or the like. In some embodiments, a trained evaluation model 1220 may be pre-uploaded to a storage device (e.g., the storage device 980) by a technician and then retrieved by a processing device (e.g., the processing device 970).

In some embodiments, as shown in FIG. 12, an input of the evaluation model 1220 includes a replenishment pressure 1111, a recovery pressure 1112, a vibration characteristic 1211, and temperature data 1212, and an output of the evaluation model 1220 includes a predicted super-lubricant loss rate 1114 of a super-lubricant in a dynamic pressure groove bottom. In some embodiments, the processing device may obtain the vibration characteristic 1211 and the temperature data 1212 in multiple ways. For example, the processing device may obtain the temperature data acquired by a temperature sensor that is in a communication connection with the processing device.

In some embodiments, a second training sample for training the evaluation model includes a sample replenishment pressure, a sample recovery pressure, a sample vibration characteristic, and sample temperature data. In some embodiments, a second label of the second training sample may be obtained by a technician experimenting with the second training sample. For example, a friction pair device is tested using the second training sample as experimental data, and an actual super-lubricant loss rate corresponding to the experimental data is determined as the second label. The experimental data includes multiple sets of data, with each set comprising a replenishment pressure, a recovery pressure, a vibration characteristic, and temperature data. At least one set of replenishment pressure, recovery pressure, vibration characteristic, and temperature data in the experimental data is different. Merely by way of example, the actual super-lubricant loss rate of the experimental data may be determined as follows: a volume of a super-lubricant injected into a dynamic pressure groove and a Tesla valve structure from an oil reservoir at the beginning of the experiment is designated as an initial oil volume (e.g., the initial oil volume is a difference in oil volume before and after the super-lubricant is injected at the start of the experiment, which may be obtained through an oil level sensor). At the end of the experiment, the super-lubricant in the dynamic pressure groove and Tesla valve structure is extracted to determine a remaining oil volume. A difference between the initial oil volume and the remaining oil volume is determined, and a ratio of the different to an experiment duration is determined as the actual super-lubricant loss rate.

A training process of the evaluation model is similar to the training process of the movement parameter model, and will not be repeated here.

In some embodiments, the processing device is configured to: issue an early warning in response to the predicted super-lubricant loss rate being greater than a first rate threshold; and control the friction pair device to stop operation in response to the predicted super-lubricant loss rate being greater than a second rate threshold. The first rate threshold is smaller than the second rate threshold.

The first rate threshold refers to the loss rate threshold that triggers a warning. The second rate threshold refers to a flow rate threshold that greatly exceeds a normal range. If the predicted super-lubricant loss rate is greater than the second rate threshold, it indicates potential failure of the friction pair, such as leakage in the friction pair device, necessitating a halt in operation to check for the fault cause.

The first rate threshold and the second rate threshold may be pre-set by a technician based on experience. For example, the first rate threshold and the second rate threshold may be set with reference to the actual rate of super-lubricant loss from the experimental data described previously. Merely by way of example, the first rate threshold may be a median of actual super-lubricant loss rates, and the second rate threshold may be a maximum of the actual super-lubricant loss rates.

In some embodiments of the present disclosure, the evaluation model can accurately determine the predicted super-lubricant loss rate, thereby issuing a warning or halting operation based on the predicted super-lubricant loss rate. This can further ensure the reliability of the friction pair device. Meanwhile, the predicted super-lubricant loss rate output from the evaluation model can be used as the input of the movement parameter model to obtain the movement parameter more accurately, ensuring that the super-lubricant at the dynamic pressure groove bottom of the friction pair device remains in a most optimal state, thereby achieving low friction effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

It should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the count of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A friction pair device comprising a friction pair stationary member, a plurality of micro channels, a Tesla valve structure, and a stress application device; wherein the friction pair stationary member includes a friction pair static surface, the friction pair static surface is provided with a dynamic pressure groove; the dynamic pressure groove includes a dynamic pressure groove bottom; a surface of the dynamic pressure groove bottom has micro-nano scale gaps, a super-lubricant is disposed within the micro-nano scale gaps, the super-lubricant is injected into the micro-nano scale gaps to form a super-lubricant layer, the super-lubricant layer allows a liquid-film and liquid medium molecules of a super-lubricant layer interface to move freely along the dynamic pressure groove bottom, a slip velocity of the liquid medium molecules approaches a moving velocity of a friction pair dynamic surface, a slip length of the liquid medium molecules approaches positive infinity, and a super slip surface is formed on the dynamic pressure groove bottom of the friction pair static surface;

the plurality of micro channels are disposed in regions in which at least one of a pressure, a temperature, and a velocity of the liquid film is uniform, the plurality of micro channels are in communication with the dynamic pressure groove bottom, and the super-lubricant enters the dynamic pressure groove bottom through the plurality of micro channels;

the Tesla valve structure includes a forward Tesla valve and a reverse Tesla valve; the forward Tesla valve is configured to enable a flow connection between the plurality of micro channels and an oil reservoir; the reverse Tesla valve is configured to enable a flow connection between the dynamic pressure groove bottom and the oil reservoir; and the stress application device is configured to apply a shear stress to the liquid medium molecules via one or more of a temperature gradient, a magnetic field, or an electric field.

2. The friction pair device of claim 1, wherein the gaps on the surface of the dynamic pressure groove bottom are obtained by roughening an original dynamic pressure groove bottom; and the roughening includes plating a porous coating or preparing a micro-nano structure on the original dynamic pressure groove bottom of the friction pair static surface.

3. The friction pair device of claim 1, wherein the super-lubricant includes a low-surface-energy super-lubricant, the low-surface-energy super-lubricant being a solution formed by mixing lauric acid and silicone oil.

4. The friction pair device of claim 1, wherein when an amount of the super-lubricant at the dynamic pressure groove bottom is less than a first predetermined threshold, the super-lubricant flows sequentially from the oil reservoir into the forward Tesla valve, the micro channels, and the dynamic pressure groove bottom, to replenish the super-lubricant in the super-lubricant layer on the dynamic pressure groove bottom;

when the amount of the super-lubricant at the dynamic pressure groove bottom is greater than a second predetermined threshold, the super-lubricant flows sequentially from the dynamic pressure groove bottom into the micro channels, the reverse Tesla valve, and the oil reservoir, and a portion of the super-lubricant is recovered.

5. The friction pair device of claim 4, further comprising a first reservoir ring groove and a second reservoir ring groove, wherein when the amount of the super-lubricant at the dynamic pressure groove bottom is less than the first predetermined threshold, the super-lubricant flows sequentially from the oil reservoir into the second reservoir ring groove, the forward Tesla valve, the first reservoir ring groove, the micro channels, and the dynamic pressure groove bottom;

when the amount of the super-lubricant at the dynamic pressure groove bottom is greater than the second predetermined threshold, the super-lubricant flows sequentially from the dynamic pressure groove bottom into the micro channels, the first reservoir ring groove, the reverse Tesla valve, the second reservoir ring groove, and the oil reservoir.

6. The friction pair device of claim 1, wherein the friction pair static surface of the friction pair stationary member is provided with at least two dynamic pressure grooves, and a distance between any two of the at least two dynamic pressure grooves is greater than 0.

7. The friction pair device of claim 6, wherein when the friction pair device is annular, the dynamic pressure groove is one or more of a spiral groove, an arcuate groove, a fan-shaped groove, a rhombic groove, a T-shaped groove, or an L-shaped groove, a count of the dynamic pressure groove is in a range of 10 to 12, and the 10 to 12 dynamic pressure grooves are distributed along a circumference of the annular friction pair device.

8. The friction pair device of claim 1, further comprising a temperature sensor, a first pressure sensor, and a second pressure sensor, wherein the temperature sensor is disposed at the dynamic pressure groove and configured to monitor temperature data of the dynamic pressure groove;

the first pressure sensor is disposed at the forward Tesla valve and configured to obtain a replenishment pressure; and the second pressure sensor is disposed at the reverse Tesla valve and configured to obtain a recovery pressure.

9. The friction pair device of claim 1, wherein an electric piston is disposed at a bottom portion of the oil reservoir, the electric piston is configured to apply a forward pressure or a reverse suction force to the super-lubricant in the oil reservoir.

10. The friction pair device of claim 1, further comprising a vibration sensor configured to obtain a vibration characteristic of the friction pair device.

11. The friction pair device of claim 1, further comprising a first solenoid valve and a second solenoid valve;

the first solenoid valve is disposed at a junction between the oil reservoir and the forward Tesla valve; and the second solenoid valve is disposed at a junction between the oil reservoir and the reverse Tesla valve.

12. The friction pair device of claim 1, further comprising a processing device and a storage device, wherein each of the processing device and the storage device is communicatively connected to one or more of a temperature sensor, a first pressure sensor, a second pressure sensor, an electric piston, a vibration sensor, a first solenoid valve, and a second solenoid valve.

13. The friction pair device of claim 12, wherein the processing device is configured to:

determine, through a movement parameter model, a movement parameter of the electric piston based on a replenishment pressure and a recovery pressure, the movement parameter model being a machine learning model stored in the storage device; and control the electric piston to operate based on the movement parameter.

14. The friction pair device of claim 13, wherein a training sample of the movement parameter model includes preferred historical data; the preferred historical data is historical data in which a historical replenishment pressure and a historical recovery pressure satisfy a predetermined condition.

15. The friction pair device of claim 13, wherein an input of the movement parameter model includes opening and closing data of the first solenoid valve and the second solenoid valve.

16. The friction pair device of claim 13, wherein an input of the movement parameter model includes a predicted super-lubricant loss rate.

17. The friction pair device of claim 13, wherein an output of the movement parameter model includes opening and closing control information; and the first solenoid valve and the second solenoid valve operate based on the opening and closing control information.

18. The friction pair device of claim 12, wherein the processing device is configured to:

determine, via an evaluation model a predicted super-lubricant loss rate of the dynamic pressure groove bottom based on a vibration characteristic, a replenishment pressure, a recovery pressure, and temperature data; wherein the evaluation model is a machine learning model stored in the storage device.

19. A liquid film sealing device, comprising the friction pair device of claim 1.

20. The liquid film sealing device of claim 19, further comprising an oil pipe connector, a pressure plate, a fixing member, a static ring, a dynamic ring, and a compensation seat; wherein the oil pipe connector is disposed on an outer side of the pressure plate; the pressure plate is fixedly connected to the Tesla valve structure of the friction pair device;

the fixing member is configured to secure the Tesla valve structure to the static ring;

the dynamic pressure groove of the friction pair device is disposed on the static ring; and the dynamic ring is disposed on the compensation seat.

\* \* \* \* \*